(12) United States Patent
Hagai et al.

(10) Patent No.: US 7,944,584 B2
(45) Date of Patent: May 17, 2011

(54) COLOR-CONVERTING DEVICE

(75) Inventors: Naoki Hagai, Komaki (JP); Masashi Ueda, Nagoya (JP); Masaki Kondo, Toyoake (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1204 days.

(21) Appl. No.: 10/831,331

(22) Filed: Apr. 26, 2004

(65) Prior Publication Data

US 2004/0212817 A1 Oct. 28, 2004

(30) Foreign Application Priority Data

Apr. 25, 2003 (JP) .................................. 2003-122126

(51) Int. Cl.
G06F 15/00 (2006.01)

(52) U.S. Cl. ......... 358/1.9; 358/1.15; 358/534; 358/1.1; 358/1.16

(58) Field of Classification Search .................. 358/518, 358/3.23, 530, 523–525, 1.13, 1.1, 1.14, 358/1.15, 1.9; 709/217, 224, 223, 249, 238; 710/1, 105, 15, 62; 700/169, 175, 108, 110; 347/17, 101

See application file for complete search history.

(56) References Cited

U.S. PATENT DOCUMENTS

| 5,121,196 | A | * | 6/1992 | Hung ............................ 358/504 |
| 5,311,332 | A | | 5/1994 | Imao et al. | |
| 5,317,426 | A | * | 5/1994 | Hoshino ........................ 358/515 |
| 5,504,821 | A | | 4/1996 | Kanamori et al. | |
| 6,335,734 | B1 | * | 1/2002 | Nagae et al. ................... 345/589 |
| 6,415,065 | B1 | * | 7/2002 | Miyake ......................... 382/300 |
| 6,571,010 | B1 | | 5/2003 | Inoue | |
| 7,009,734 | B2 | * | 3/2006 | Suwa et al. ..................... 358/1.9 |
| 7,151,836 | B1 | * | 12/2006 | Funahashi et al. ............. 381/150 |
| 7,151,863 | B1 | * | 12/2006 | Bradley et al. ................. 382/299 |
| 2001/0033288 | A1 | | 10/2001 | Nabeshima | |
| 2002/0038196 | A1 | * | 3/2002 | Johnson et al. ................ 702/179 |
| 2002/0063911 | A1 | * | 5/2002 | Hui ............................... 358/525 |
| 2005/0057765 | A1 | | 3/2005 | Fujita et al. | |

FOREIGN PATENT DOCUMENTS

| JP | A 5-75848 | 3/1993 |
| JP | A 7-99587 | 4/1995 |
| JP | A-11-328391 | 11/1999 |
| JP | A 2000-165691 | 6/2000 |
| JP | A-2001-251524 | 9/2001 |
| JP | A 2001-257899 | 9/2001 |
| JP | A-2002-077650 | 3/2002 |
| JP | A-2003-110868 | 4/2003 |

OTHER PUBLICATIONS

Japanese Office Action, issued Jul. 28, 2009.

* cited by examiner

*Primary Examiner* — Twyler L Haskins
*Assistant Examiner* — Brendan McCommas
(74) *Attorney, Agent, or Firm* — Oliff & Berridge, PLC

(57) ABSTRACT

When executing a color conversion process, a CPU determines whether a CMYK conversion indication flag Fc has been set. If the flag Fc has been set, then the CPU reads data of an RGB-CMYK conversion table and performs a cube interpolation process by using the RGB-CMYK conversion table. On the other hand, if the flag Fc has not been set, then the CPU reads data of an RGB-RGB conversion table and performs a triangular pyramid interpolation process by using the RGB-RGB conversion table.

21 Claims, 20 Drawing Sheets

FIG.2(a)

$T_{RGB-RGB}$

| Ir | Ig | Ib | R' | G' | B' |
|---|---|---|---|---|---|
| 0 | 0 | 0 | $R_{000}$ | $G_{000}$ | $B_{000}$ |
| 0 | 0 | 1 | $R_{001}$ | $G_{001}$ | $B_{001}$ |
| 0 | 0 | 2 | $R_{002}$ | $G_{002}$ | $B_{002}$ |
| . | . | . | . | . | . |
| . | . | . | . | . | . |
| . | . | . | . | . | . |
| . | . | . | . | . | . |
| m | m | m | $R_{mmm}$ | $G_{mmm}$ | $B_{mmm}$ |

FIG.2(b)

$T_{RGB-CMYK}$

| Ir | Ig | Ib | C | M | Y | K |
|---|---|---|---|---|---|---|
| 0 | 0 | 0 | $C_{000}$ | $M_{000}$ | $Y_{000}$ | $K_{000}$ |
| 0 | 0 | 1 | $C_{001}$ | $M_{001}$ | $Y_{001}$ | $K_{001}$ |
| 0 | 0 | 2 | $C_{002}$ | $M_{002}$ | $Y_{002}$ | $K_{002}$ |
| . | . | . | . | . | . | . |
| . | . | . | . | . | . | . |
| . | . | . | . | . | . | . |
| . | . | . | . | . | . | . |
| m | m | m | $C_{mmm}$ | $M_{mmm}$ | $Y_{mmm}$ | $K_{mmm}$ |

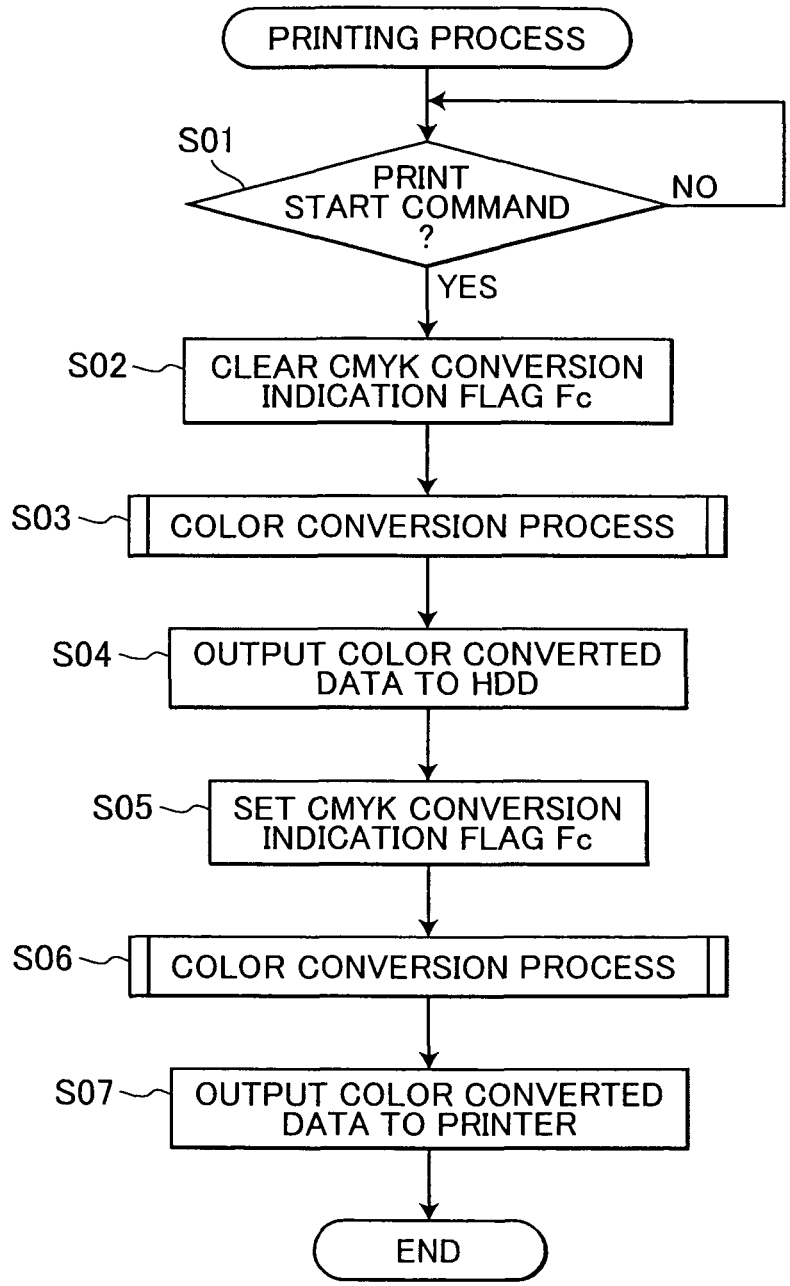

SPACE A

SPACE B

TRIANGULAR PYRAMID C

SPACE D

TRIANGULAR PYRAMID E

TRIANGULAR PYRAMID F

TRIANGULAR PYRAMID G

SPACE H

TRIANGULAR PYRAMID I

TRIANGULAR PYRAMID J

FIG.11
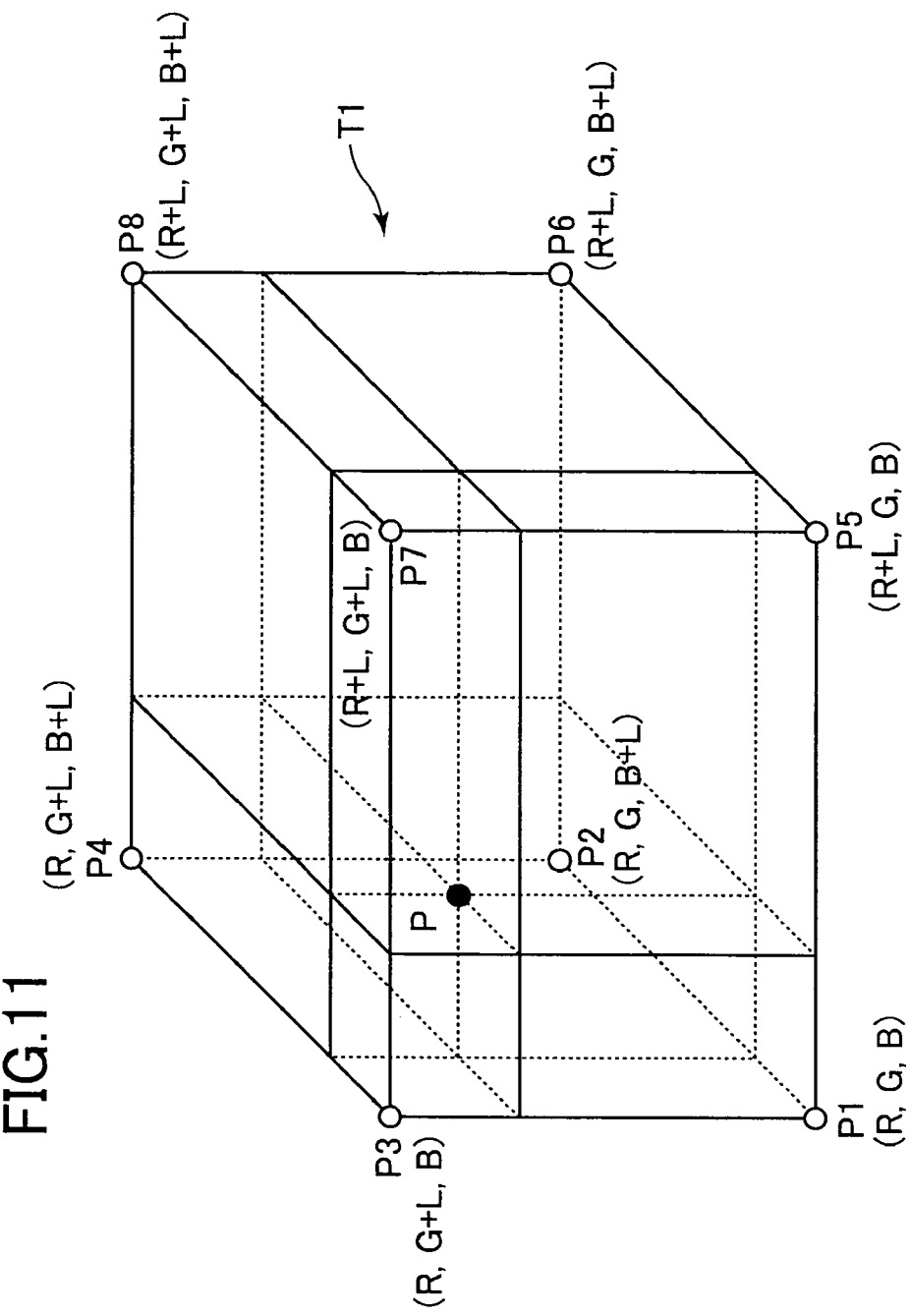
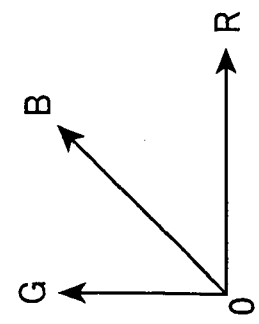

FIG.14
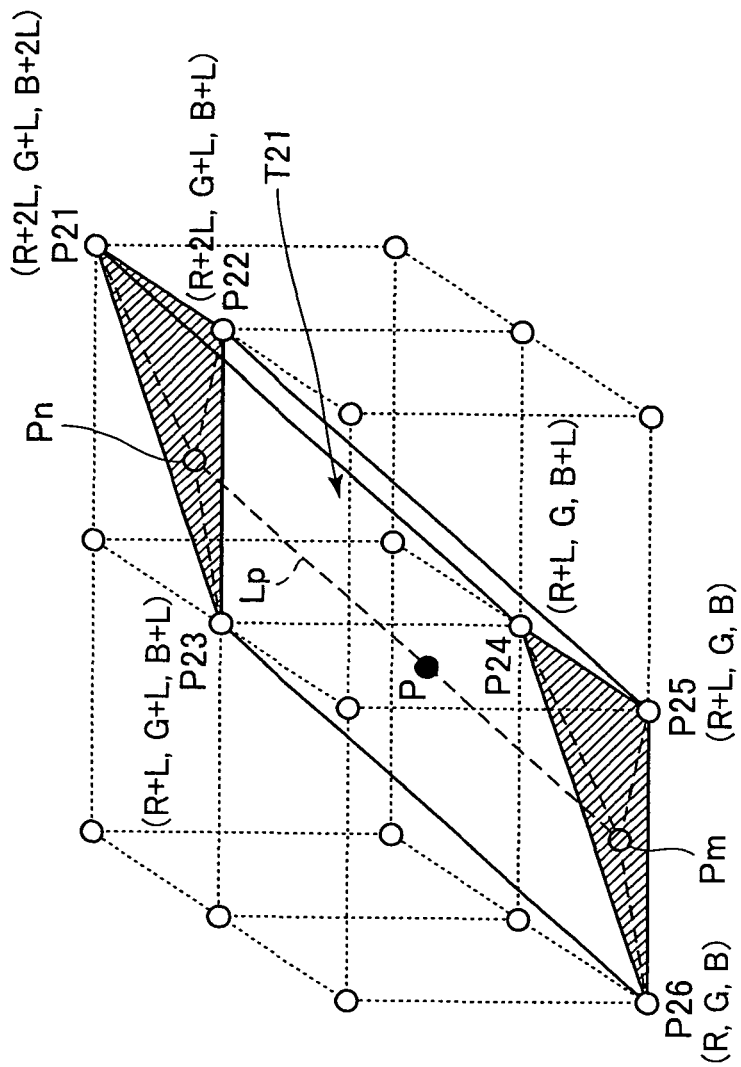
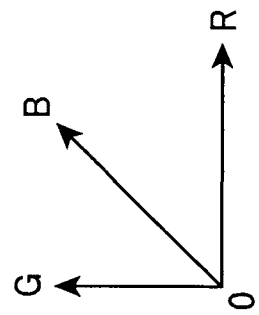

US 7,944,584 B2

COLOR-CONVERTING DEVICE

BACKGROUND OF THE INVENTION

1. Field of the Invention

The present invention relates to a color-converting device for converting an input color signal in an input-side color space into an output color signal in an output-side color space.

2. Description of Related Art

Normally, a color reproducible range (gamut) on a color CRT monitor is different from that of a color printer. Accordingly, in order to convert RGB (red, green, blue) color signals for a color CRT monitor into CMYK (cyan, magenta, yellow, black) color signals for a color printer, an RGB-RGB conversion process (color matching) is performed to correct this difference before performing an RGB-CMYK conversion process.

Color signal conversion methods that employ a color conversion table are in wide use today. For example, the color conversion table stores therein CMYK values for reproducing RGB values at grid or lattice points defined in the RGB color space. CMYK values for reproducing RGB values that do not fall on the grid points are determined through interpolation based on CMYK values corresponding to the grid points.

Methods commonly used for determining output values through interpolation involve selecting four through eight grid points around the target point (hereinafter referred to as the conversion point). Some such interpolation methods well known in the art include a method using a cube disclosed in United States Patent Application Publication No. 2001/33288A1 and a method using a triangular pyramid disclosed in U.S. Pat. No. 6,571,010.

SUMMARY OF THE INVENTION

It is an object of the present invention to provide an improved color-converting device that is capable of enhancing color reproducibility.

In order to attain the above and other objects, the present invention provides a color-converting device for converting an input color signal defined in an input-side color space into an output color signal defined in an output-side color space. The color-converting device includes: an input portion; a storing portion; a cube-employing interpolation portion; a gray-axis-solid-employing interpolation portion; a determining portion; and a selection portion. The input portion receives an input color signal defined in an input-side color space, the input color signal having a plurality of input-side color components, the input-side color space having a plurality of coordinate axes defined by the plurality of input-side color components, the input-side color space having a predetermined gray axis, each position on the gray axis having values equal to one another for the plurality of input-side color components. The storing portion is prestored with a color conversion table indicative of a one-to-one correspondence between a plurality of input-side grid color signals defined in the input-side color space and a plurality of output-side color signals defined in an output-side color space, each input-side grid color signal having the plurality of input-side color components, the plurality of input-side grid color signals indicating a plurality of grid points, each of which is defined by the plurality of coordinate axes in the input-side color space, each output-side color signal having a plurality of output-side color components. The cube-employing interpolation portion selects, from among all the grid points, eight grid points forming a cube, which includes therein a position of the input color signal defined in the input-side color space, and performs an interpolation calculation to convert the input color signal into an output color signal based on the eight output-side color signals for the eight grid points and based on the positions of the eight grid points in relation to the position of the input color signal. The gray-axis-solid-employing interpolation portion selects, from among all the grid points, several grid points forming a solid, which includes therein a position of the input color signal defined in the input-side color space and whose one edge extends in a direction in which the gray axis extends, and performs an interpolation calculation to convert the input color signal into an output color signal based on the several output-side color signals for the several grid points and based on the positions of the several grid points in relation to the position of the input color signal. The determining portion checks a state of the output-side color space. The selection portion selects either one of the cube-employing interpolation portion and the gray-axis-solid-employing interpolation portion dependently on the determined results, and causes the selected one of the cube-employing interpolation portion and the gray-axis-solid-employing interpolation portion to execute its interpolation operation to convert the input color signal into an output color signal.

According to another aspect, the present invention provides a storage medium storing a color-converting program readable by a computer storing a color conversion table, the color-converting program being for converting an input color signal defined in an input-side color space into an output color signal defined in an output-side color space. The color-converting program includes: an input program; a cube-employing interpolation program; a gray-axis-solid-employing interpolation program; a determining program; and a selection program. The input program receives an input color signal defined in an input-side color space, the input color signal having a plurality of input-side color components, the input-side color space having a plurality of coordinate axes defined by the plurality of input-side color components, the input-side color space having a predetermined gray axis, each position on the gray axis having values equal to one another for the plurality of input-side color components, the color conversion table being indicative of a one-to-one correspondence between a plurality of input-side grid color signals defined in the input-side color space and a plurality of output-side color signals defined in an output-side color space, each input-side grid color signal having the plurality of input-side color components, the plurality of input-side grid color signals indicating a plurality of grid points, each of which is defined by the plurality of coordinate axes in the input-side color space, each output-side color signal having a plurality of output-side color components. The cube-employing interpolation program selects, from among all the grid points, eight grid points forming a cube, which includes therein a position of the input color signal defined in the input-side color space, and performs an interpolation calculation to convert the input color signal into an output color signal based on the eight output-side color signals for the eight grid points and based on the positions of the eight grid points in relation to the position of the input color signal. The gray-axis-solid-employing interpolation program selects, from among all the grid points, several grid points forming a solid, which includes therein a position of the input color signal defined in the input-side color space and whose one edge extends in a direction in which the gray axis extends, and performs an interpolation calculation to convert the input color signal into an output color signal based on the several output-side color signals for the several grid points and based on the positions of the several grid points in relation to the position of the input color signal. The determining program checks a state of the output-side color space. The selection program selects either one of the cube-employing interpolation program and the gray-axis-solid-employing interpolation program dependently on the determined results, and causes the selected one of the cube-employing interpolation program and the gray-axis-solid-employing interpolation program to execute its interpolation operation to convert the input color signal into an output color signal.

According to another aspect, the present invention provides a color-converting device for converting an RGB input color signal defined in an RGB input-side color space dependent on an input-side device into a CMYK output color signal defined in a CMYK output-side color space dependent on an output-side device. The color-converting device includes an input portion and a conversion portion. The conversion portion includes: a storing portion; an RGB-RGB color conversion table selecting portion; an RGB-RGB conversion portion; an RGB-CMYK color conversion table selecting portion; and an RGB-CMYK conversion portion. The input portion receives an RGB input color signal defined in an RGB input-side color space, the RGB input color signal having red, green, and blue input-side color components, the RGB input-side color space having three coordinate axes defined by the red, green, and blue input-side color components, the RGB input-side color space having a predetermined gray axis, each position on the gray axis having values equal to one another for the red, green, and blue input-side color components. The conversion portion converts the RGB input color signal into an RGB output color signal defined in an RGB output-side color space, the RGB output color signal having red, green, and blue output-side color components, the RGB output-side color space having three coordinate axes defined by the red, green, and blue output-side color components, the RGB output-side color space having a predetermined gray axis, each position on the gray axis having values equal to one another for the red, green, and blue output-side color components. The conversion portion further converts the RGB output color signal into a CMYK output color signal defined in a CMYK output-side color space, the CMYK output color signal having cyan, magenta, yellow, and black output-side color components, the CMYK output-side color space being defined as a four dimensional color space defined by the cyan, magenta, yellow, and black output-side color components. The storing portion is prestored with an RGB-RGB color conversion table and an RGB-CMYK color conversion table. The RGB-RGB color conversion table is indicative of a one-to-one correspondence between a plurality of RGB grid color signals defined in the RGB input-side color space and a plurality of RGB output-side color signals defined in the RGB output-side color space, each RGB input-side grid color signal having the red, greens and blue input-side color components, the plurality of RGB input-side grid color signals indicating a plurality of grid points, each of which is defined by the three coordinate axes in the RGB input-side color space, each RGB output-side color signal having red, green, and blue output-side color components. The RGB-CMYK color conversion table is indicative of a one-to-one correspondence between a plurality of RGB grid color signals defined in the RGB output-side color space and a plurality of CMYK output-side color signals defined in the CMYK output-side color space, each RGB output-side grid color signal having the red, green, and blue output-side color components, the plurality of RGB output-side grid color signals indicating a plurality of grid points, each of which is defined by the three coordinate axes in the RGB output-side color space, each CMYK output-side color signal having cyan, magenta, yellow, and black output-side color components. The RGB-RGB color conversion table selecting portion selects the RGB-RGB color conversion table from the storing portion. The RGB-RGB conversion portion executes, upon selection of the RGB-RGB color conversion table indicative of the three-dimensional RGB output-side color space, a gray-axis-solid-employing interpolation to selects from among all the grid points in the RGB-RGB color conversion table, several grid points forming a solid, which includes therein a position of the RGB input color signal defined in the RGB input-side color space and whose one edge extends in a direction in which the gray axis extends, and to perform an interpolation calculation to convert the RGB input color signal into an RGB output color signal based on the several RGB output-side color signals for the several grid points and based on the positions of the several grid points in relation to the position of the RGB input color signal. The RGB-CMYK color conversion table selecting portion selects the RGB-CMYK color conversion table from the storing portion. The RGB-CMYK conversion portion executes, upon selection of the RGB-CMYK color conversion table indicative of the four-dimensional CMYK output-side color space, a cube-employing interpolation portion to select, from among all the grid points in the RGB-CMYK color conversion table, eight grid points forming a cube, which includes therein a position of the RGB output color signal defined in the RGB output-side color space, and to perform an interpolation calculation to convert the RGB output color signal into a CMYK output color signal based on the eight CMYK output-side color signals for the eight grid points and based on the positions of the eight grid points in relation to the position of the RGB output color signal.

According to another aspect, the present invention provides a color-converting device for converting an RGB input color signal defined in an RGB input-side color space dependent on an input-side device into a CMYK output color signal defined in a CMYK output-side color space dependent on an output-side device. The color-converting device includes: an input portion and a conversion portion. The conversion portion includes: a storing portion; an RGB-RGB color conversion table selecting portion; an RGB-RGB conversion portion; an RGB-CMYK color conversion table selecting portion; and an RGB-CMYK conversion portion. The input portion receives an RGB input color signal defined in an RGB input-side color space, the RGB input color signal having red, green, and blue input-side color components, the RGB input-side color space having three coordinate axes defined by the red, green, and blue input-side color components, the RGB input-side color space having a predetermined gray axis, each position on the gray axis having values equal to one another for the red, green, and blue input-side color components. The conversion portion converts the RGB input color signal into an RGB output color signal defined in an RGB output-side color space, the RGB output color signal having red, green, and blue output-side color components, the RGB output-side color space having three coordinate axes defined by the red, green, and blue output-side color components, the RGB output-side color space having a predetermined gray axis, each position on the gray axis having values equal to one another for the red, green, and blue output-side color components, the conversion portion further converting the RGB output color signal into a CMYK output color signal defined in a CMYK output-side color space, the CMYK output color signal having cyan, magenta, yellow, and black output-side color components, the CMYK output-side color space being defined as a four dimensional color space defined by the cyan, magenta, yellow, and black output-side color components. The storing portion is prestored with an RGB-RGB color conversion table and an RGB-CMYK color conversion table, the RGB-RGB color conversion table being indicative of a one-to-one correspondence between a plurality of RGB grid color signals defined in the RGB input-side color space and a plurality of RGB output-side color signals defined in the RGB output-side color space, each RGB input-side grid color signal having the red, green, and blue input-side color components, the plurality of RGB input-side grid color signals indicating a plurality of grid points, each of which is defined by the three coordinate axes in the RGB input-side color space, each RGB output-side color signal having red, green, and blue output-side color components, the RGB-CMYK color conversion table being indicative of a one-to-one correspondence between a plurality of RGB grid color signals defined in the RGB output-side color space and a plurality of CMYK output-side color signals defined in the CMYK output-side color space, each RGB output-side grid color signal having the red, green, and blue output-side color components, the plurality of RGB output-side grid color signals indicating a plurality of grid points, each of which is defined by the three coordinate axes in the RGB output-side color space, each CMYK output-side color signal having cyan, magenta, yellow, and black output-side color components. The RGB-RGB color conversion table selecting portion selects the RGB-RGB color conversion table from the storing portion, and determines whether or not there exists, in the RGB output-side color space defined by the RGB-RGB color conversion table, at least one homogeneous grid point that is surrounded by a plurality of surrounding grid points, a difference, in each of the red, green, and blue output-side color components, between the RGB output-side color signal for the homogeneous grid point and the RGB output-side color signal for each surrounding grid point being less than or equal to a predetermined threshold value. The RGB-RGB conversion portion converts the RGB input color signal into an RGB output color signal, the RGB-RGB conversion portion executing a gray-axis-solid-employing interpolation, when there exists no homogeneous grid point in the RGB output-side color space, to select, from among all the grid points in the RGB input-side color space, several grid points forming a solid, which includes therein a position of the RGB input color signal defined in the RGB input-side color space and whose one edge extends in a direction in which the gray axis extends, and to perform an interpolation calculation to convert the RGB input color signal into an RGB output color signal based on the several RGB output-side color signals for the several grid points and based on the positions of the several grid points in relation to the position of the RGB input color signal, the RGB-RGB conversion portion executing a cube-employing interpolation, when there exists at least one homogeneous grid point in the RGB output-side color space, to select, from among all the grid points in the RGB input-side color space, eight grid points forming a cube, which includes therein a position of the RGB input color signal defined in the RGB input-side color space, and to perform an interpolation calculation to convert the RGB input color signal into an RGB output color signal based on the eight RGB output-side color signals for the eight grid points and based on the positions of the eight grid points in relation to the position of the RGB input color signal. The RGB-CMYK color conversion table selecting portion selects the RGB-CMYK color conversion table from the storing portion, and determines whether or not there exists, in the CMYK output-side color space defined by the RGB-CMYK color conversion table, at least one homogeneous grid point that is surrounded by a plurality of surrounding grid points, a difference, in each of the cyan, magenta, yellow, and black output-side color components, between the CMYK output-side color signal for the homogeneous grid point and the CMYK output-side color signal for each surrounding grid point being less than or equal to a predetermined threshold value. The RGB-CMYK conversion portion converts the RGB output color signal into a CMYK output color signal, the RGB-CMYK conversion portion executing a gray-axis-solid-employing interpolation, when there exists no homogeneous grid point in the CMYK output-side color space, to select, from among all the grid points in the CMYK output-side color space, several grid points forming a solid, which includes therein a position of the RGB output color signal defined in the RGB output-side color space and whose one edge extends in a direction in which the gray axis extends, and to perform an interpolation calculation to convert the RGB output color signal into a CMYK output color signal based on the several CMYK output-side color signals for the several grid points and based on the positions of the several grid points in relation to the position of the RGB output color signal, the RGB-CMYK conversion portion executing a cube-employing interpolation, when there exists at least one homogeneous grid point in the CMYK output-side color space, to select, from among all the grid points in the RGB output-side color space, eight grid points forming a cube, which includes therein a position of the RGB output color signal defined in the RGB output-side color space, and to perform an interpolation calculation to convert the RGB output color signal into a CMYK output color signal based on the eight CMYK output-side color signals for the eight grid points and based on the positions of the eight grid points in relation to the position of the RGB output color signal.

BRIEF DESCRIPTION OF THE DRAWINGS

The above and other objects, features and advantages of the invention will become more apparent from reading the following description of the preferred embodiments taken in connection with the accompanying drawings in which:

FIG. 2(a) is an explanatory diagram showing an RGB-RGB conversion table;

FIG. 2(b) is an explanatory diagram showing an RGB-CMYK conversion table;

FIG. 3 is a flowchart showing steps in a printing process according to the first embodiment;

FIG. 11 is an explanatory diagram illustrating cube interpolation;

FIG. 14 is an explanatory diagram showing a slanted triangular prism interpolation process according to a first modification of the first embodiment;

DETAILED DESCRIPTION OF THE PREFERRED EMBODIMENTS

Figure 1:
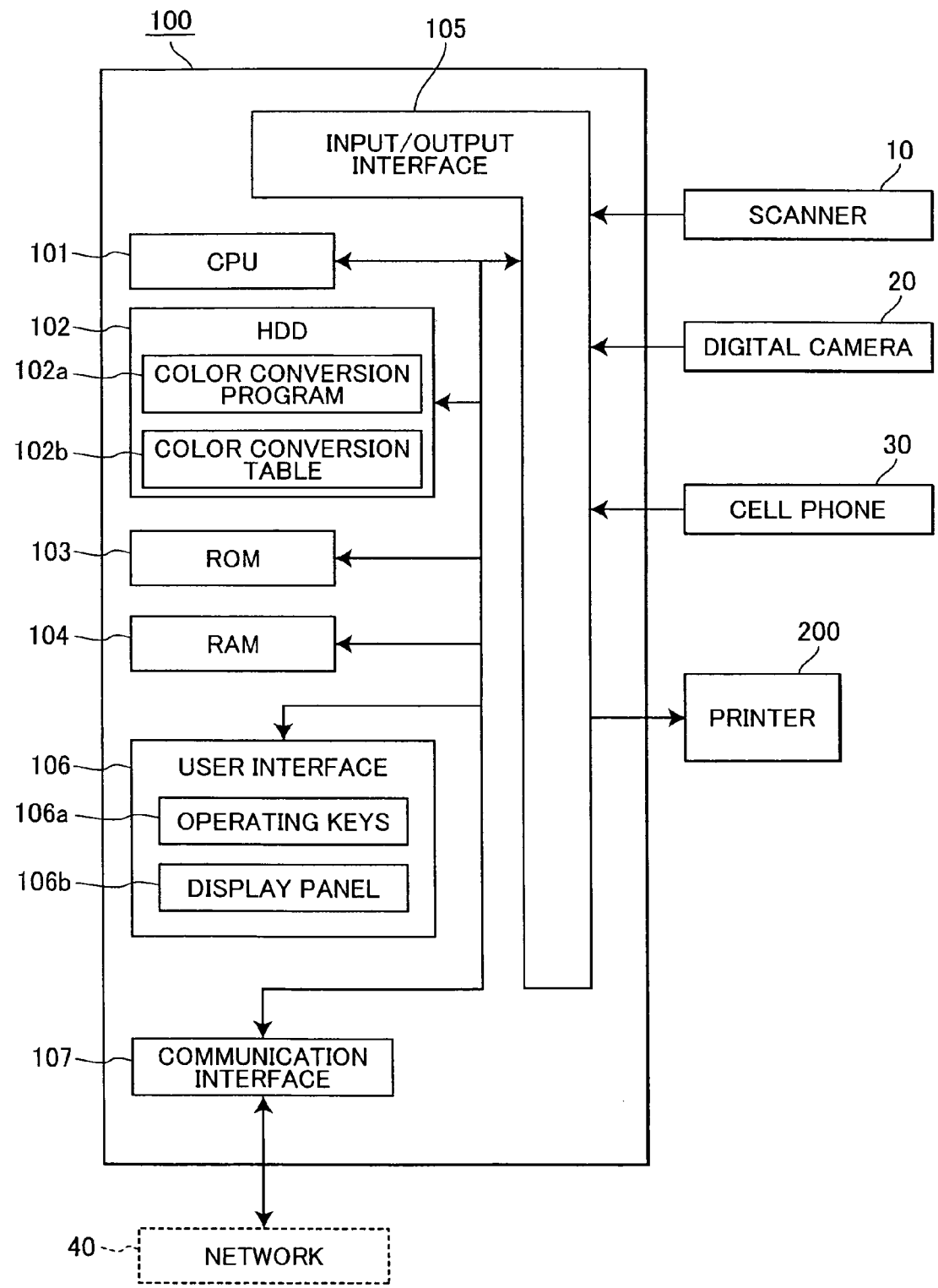
FIG. 1 is a block diagram showing the construction of a color-converting device according to a first embodiment of the present invention.

A color-converting device according to preferred embodiments of the present invention will be described while referring to the accompanying drawings wherein like parts and components are designated by the same reference numerals to avoid duplicating description.

First Embodiment

According to a first embodiment of the present invention, a personal computer serves as a color-converting device.

FIG. 1 shows the personal computer 100 of the present embodiment.

The personal computer 100 includes a CPU 101, a hard disc drive 102, a ROM 103, a RAM 104, an input/output interface 105, a user interface 106, and a communication interface 107. The CPU 101 is for performing processes by executing predetermined processing programs. The ROM 103 is prestored with various control programs. The RAM 104 is provided with various memory areas for storing data and the like inputted from an external device. The user interface 106 has operating keys 106a that can be operated by a user and a display panel 106b for displaying various data. The input/output interface 105 is interconnected with the CPU 101, the hard disc drive 102, the ROM 103, the RAM 104, the user interface 106, and the communication interface 107. The input/output interface 105 can be connected to various input devices, such as a scanner 10, a digital camera 20, and a cell phone 30. The input/output interface 105 is connected also to a printer 200. The communication interface 107 can be connected to a network 40 such as the Internet. The user interface 106 is for outputting a print start command to the CPU 101 when the user performs an operation on the operating keys 106a to input his/her desire to start printing.

The input device (the scanner 10, digital camera 20, cell phone 30, or network 40) inputs into the personal computer 100 a plurality of sets of image data (which will be referred to as a plurality of sets of input image data (Rin, Gin, Bin) hereinafter) that indicate a plurality of pixels in one image and that include color information. Each set of input image data (Rin, Gin, Bin) undergoes a color conversion process executed by the personal computer 100. During the color conversion process, each input image data set (Rin, Gin, Bin) is first converted into a set of image data (which will be referred to as a set of corrected image data (Rout, Gout, Bout) hereinafter) and then is converted into a set of image data (which will be referred to as a set of output image data (Cout, Mout, Yout, Kout) hereinafter), before being outputted to the printer 200.

Storage areas 102a and 102b are allocated in the hard disc drive 102. The storage area 102a is for storing a color conversion program (FIG. 3, FIG. 4, FIG. 5, FIG. 6, FIG. 10) that enables the CPU 101 to execute a color conversion process and to execute a printing process. The storage area 102b is for storing color conversion tables (an RGB-RGB conversion table $T_{RGB\text{-}RGB}$ shown in FIG. 2(a) and an RGB-CMYK conversion table $T_{RGB\text{-}CMYK}$ cut shown in FIG. 2(b)) indicative of color conversion characteristics used in the color conversion process.

In the personal computer 100 having this construction, the CPU 101 receives all the sets of input image data (Rin, Gin, Bin) indicative of all the pixels in an entire image from the input device 10, 20, 30, or 40 according to a prescribed processing program, and stores all the sets of input image data (Rin, Gin, Bin) on the hard disc drive 102, for example. It is noted that each component Rin, Gin, Bin in each input image data set (Rin, Gin, Bin) has an eight-bit value indicating one of 256 gradations from 0 to 255, where 0 is normally the darkest level and 255 the brightest.

When the user interface 106 inputs a print start command into the CPU 101, the CPU 101 reads all the sets of input image data (Rin, Gin, Bin) from the hard disc drive 102 and stores the input image data (Rin, Gin, Bin) in the RAM 104. Subsequently, the CPU 101 reads one set of input image data (Rin, Gin, Bin) from the RAM 104 and performs the color conversion process to convert the input image data set (Rin, Gin, Bin) into a set of corrected image data (Rout, Gout, Bout) and to convert the corrected image data set (Rout, Gout, Bout) into a set of output image data (Cout, Mout, Yout, Kout) by executing the color conversion program and by using the RGB-RGB conversion table $T_{RGB\text{-}RGB}$ and the RGB-CMYK conversion table $T_{RGB\text{-}CMYK}$. After completing the color conversion process for all the sets of input image data (Rin, Gin, Bin), the CPU 101 outputs all the sets of output image data (Cout, Mout, Yout, Kout) to the printer 200 via the input/output interface 105.

The RGB-CMYK conversion table $T_{RGB\text{-}CMYK}$ of FIG. 2(b) indicates color conversion characteristics of the printer 200. The RGB-RGB conversion table $T_{RGB\text{-}RGB}$ of FIG. 2(a) indicates color conversion characteristics between the input device 10, 20, 30, or 40 and the printer 200.

It is noted that a single RGB-CMYK conversion table $T_{RGB\text{-}CMYK}$ is prepared in correspondence with the printer 200. The RGB-CMYK conversion table $T_{RGB\text{-}CMYK}$ is originally recorded in a recording medium such as a flexible disk, a CD-ROM, or the like and is read from the recording medium and stored in the hard disk drive 102. Instead, the color conversion program may be downloaded to the hard disk drive 102 from the communication network 40.

A single RGB-RGB conversion table $T_{RGB\text{-}RGB}$ is prepared in correspondence with a combination of the printer 200 and one input device 10, 20, 30, or 40. The RGB-RGB conversion table $T_{RGB\text{-}RGB}$ is originally recorded in a recording medium such as a flexible disk, a CD-ROM, or the like and is read from the recording medium and stored in the hard disk drive 102. Instead, the RGB-RGB conversion table $T_{RGB\text{-}RGB}$ may be downloaded to the hard disk drive 102 from the communication network 40.

It is noted that an RGB-RGB conversion table $T_{RGB\text{-}RGB}$ may be prepared in correspondence with each image to be inputted from one input device 10, 20, 30, or 40, and may be loaded in the hard disk drive 102 from a recording medium or the communication network 40.

The color conversion program is originally recorded in a recording medium such as a flexible disk, a CD-ROM, or the like, is read from the recording medium, and is stored in the hard disk drive 102. Instead, the color conversion program may be downloaded to the hard disk drive 102 from the communication network 40.

Next, the RGB-RGB conversion table $T_{RGB-RGB}$ of FIG. 2(a) and the RGB-CMYK conversion table $T_{RGB-CMYK}$ of FIG. 2(b) will be described in greater detail.

According to the present embodiment, a three-dimensional RGB color space is defined by three components: red (R), green (G), and blue (B). In the RGB color space, an R-axis, a G-axis, and a B-axis extend perpendicularly with one another. A plurality of grid or lattice points are defined in the RGB color space so as to be discretely distributed in the RGB color space. The total number of the grid points is equal to the value of m×m×m, wherein m is a divisor of 256 and is equal to eight (8) in this example. The grid points are arranged in directions of the R-, G-, and B-axes at a uniform interval with a unit length of L (=256/m (=32, in this example)). Each grid point is identified by a set of identification numbers (Ir, Ig, Ib), wherein each identification number Ir, Ig, Ib is an integer greater than or equal to zero (0) and smaller than or equal to m. The coordinates (R, G, B) of each grid point (Ir, Ig, Ib) in the RGB color space are therefore indicated by (Ir×L, Ig×L, Ib×L).

It is noted that the grid point specified by an identification number combination (Ir=0, Ig=0, Ib=0) serves as the point of origin in the RGB color space. The identification numbers for each of the R, G, and B axes are set to increase one value at a time from the point of origin moving in the positive direction, so that a grid point exists for each combination of identification numbers. For example, the coordinates (R, G, B) of the origin grid point identified by an identification number set (Ir=0, Ig=0, Ib=0) are (0, 0, 0), the coordinates (R, G, B) of a grid point identified by an identification number set (Ir=0, Ig=0, Ib=1) are (0, 0, L), the coordinates (R, G, B) of a grid point identified by an identification number set (Ir=0, Ig=0, Ib=2) are (0, 0, 2L), and the coordinates (R, G, B) of a grid point identified by an identification number set (Ir=3, Ig=0, Ib=7) are (3L, 0, 7L).

A gray axis is defined in the RGB color space by the following formula: R=G=B. It is noted that a plurality of gray points are located on the gray axis. In each gray point, red, green, and blue color components are equal to one another. Grid points indicated by the identification number combinations (0,0,0), (1, 1, 1), (2, 2, 2), . . . , and (m, m, m) (which will be referred to as "gray grid points" hereinafter) are located on the gray axis.

A CMYK color space is defined by four components: cyan (C), magenta (M), yellow (Y), and black (K), wherein black (K) is an achromatic color. The CMYK color space is a four-dimensional color space defined by the four components.

According to the present embodiment, the RGB color space is defined for the input device 10, 20, 30, or 40. A position indicated by the coordinates of a set of input image data (Rin, Gin, Bin) is therefore defined in the RGB color space for the input device 10, 20, 30, or 40.

The RGB color space is defined also for the printer 200. A position indicated by the coordinates of a, set of corrected image data (Rout, Gout, Bout) is therefore defined in the RGB color space for the printer 200.

The CMYK color space is defined for the printer 200. A position indicated by the coordinates of a set of output image data (Cout, Mout, Yout, Kout) is therefore defined in the CMYK color space.

The RGB-RGB conversion table $T_{RGB-RGB}$ of FIG. 2(a) is used for attaining a color matching between the RGB color space defined for the input device 10, 20, 30, or 40 and the RGB color space defined for the printer 200 (output device). The RGB-RGB conversion table $T_{RGB-RGB}$ stores therein a plurality of identification number sets (Ir, Ig, Ib) (where 0≦Ir≦m, 0≦Ig≦m, 0≦Ib≦m) indicative of all the grid points (R, G, B) in the RGB color space for the input device. The RGB-RGB conversion table $T_{RGB-RGB}$ stores, in correspondence with an identification number set (Ir, Ig, Ib) for each grid point (R, G, B), a set of RGB parameters (R', G', B') that is defined in the RGB color space for the printer 200 and that represents substantially the same color with the grid point in the RGB color space for the input device. The RGB-RGB conversion table $T_{RGB-RGB}$ is prepared such that an RGB parameter set (R', G', B') for each gray grid point has the same values for all the red, green, and blue color components R', G', and B' and therefore represents gray. The RGB-RGB conversion table $T_{RGB-RGB}$ is used to convert an input image data set (Rin, Gin, Bin) defined in the RGB color space for the input device 10, 20, 30, or 40 into a corrected image data set (Rout, Gout, Bout) defined in the RGB color space for the subject input device 10, 20, 30, or 40.

The RGB-CMYK conversion table $T_{RGB-CMYK}$ of FIG. 2(b) is used for converting a color defined in the RGB color space for the printer 200 into a color signal for controlling the printer 200 to reproduce substantially the same color. The RGB-CMYK conversion table $T_{RGB-CMYK}$ stores therein a plurality of identification number sets (Ir, Ig, Ib) (where 0≦Ir≦m, 0≦Ig≦m, 0≦Ib≦m) indicative of all the grid points (R, G, B) in the RGB color space for the printer 200. The RGB-CMYK conversion table $T_{RGB-CMYK}$ stores, in correspondence with an identification number set (Ir, Ig, Ib) for each grid point (R, G, B), a set of CMYK parameters (C, M, Y, K) that is defined in the CMYK color space for the printer 200 and that controls the printer 200 to reproduce substantially the same color with the grid point in the RGB color space for the printer 200. The RGB-CMYK conversion table $T_{RGB-CMYK}$ is used to convert a corrected image data set (Rout, Gout, Bout) defined in the RGB color space for the printer 200 into an output image data set (Cout, Mout, Yout, Kout) defined in the CMYK color space for the printer 200.

Next, a printing process executed by the CPU 101 of the personal computer 100 will be described with reference to FIG. 3.

FIG. 3 is a flowchart showing steps in the printing process. This process is repeatedly executed while the personal computer 100 is operating, that is, while the power is on.

At the beginning of the printing process, the CPU 101 determines in S01 whether a print start command has been inputted.

If the CPU 101 determines that a print start command has been inputted (S01: YES), then the CPU 101 advances to S02.

On the other hand, if the CPU 101 determines that a print start command has not yet been inputted (S01: NO), then the CPU 101 repeats the process of S01.

In S02 the CPU 101 clears a CMYK conversion indication flag Fc stored in the RAM 104 (Fc=0).

In S03 the CPU 101 performs, as a color conversion process, an RGB-RGB conversion to attain a color matching between the input device 10, 20, 30, or 40 and the output device 200.

Next, in S04 the CPU 101 outputs data (corrected image data (Rout, Gout, Bout)) resulting from the color conversion process of S03 to the hard disk drive 102.

In S05 the CPU 101 sets the CMYK color conversion indication flag Fc (Fc=1).

In S06 the CPU 101 performs, as a color conversion process, an RGB-CMYK conversion to produce color signals (output image data (Cout, Mout, Yout, Kout)) supported by the printer 200.

In S07 the CPU 101 outputs color signals (output image data (Cout, Mout, Yout, Kout)) resulting from the color conversion process of S06 to the printer 200 and the printing process ends.

Figure 4:
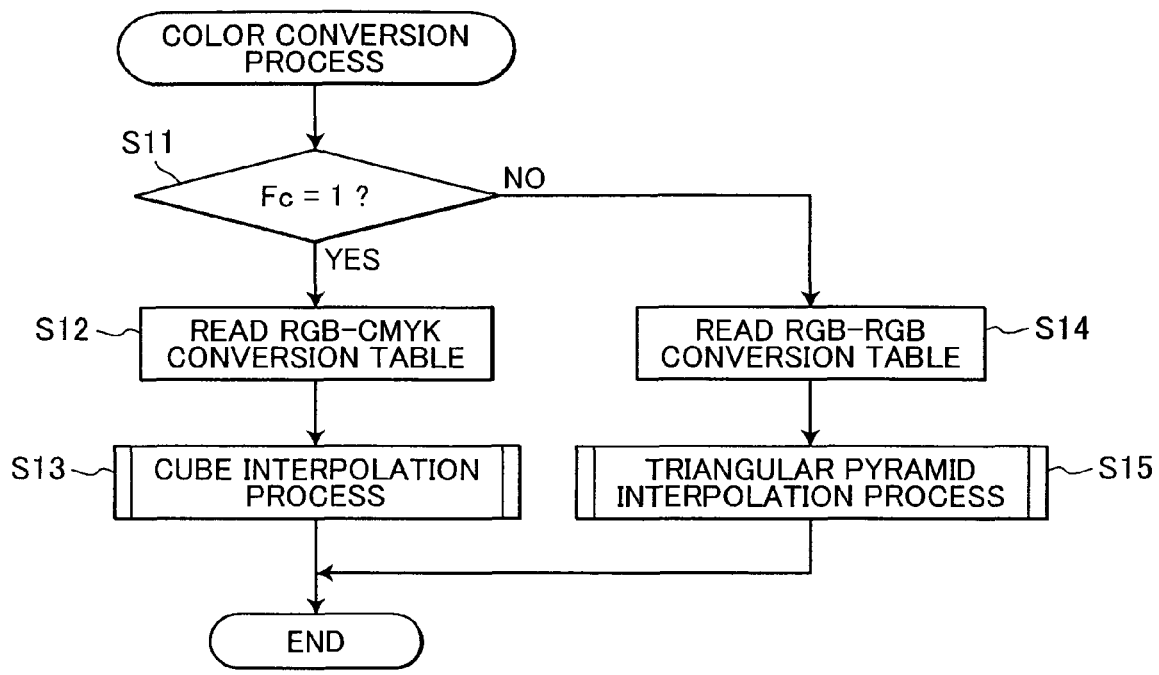
FIG. 4 is a flowchart showing steps in a color conversion process in FIG. 3.

During each of the color conversion processes of S03 and S06, the CPU 101 executes processes shown in FIG. 4.

At the beginning of the color conversion process, the CPU 101 determines in S11 whether the CMYK conversion indication flag Fc has been set.

If the CPU 101 determines that the flag Fc has not been set (S11: NO), then in S14 the CPU 101 reads data of the RGB-RGB conversion table $T_{RGB-RGB}$ of FIG. 2(a) from the hard disc drive 102 and stores this data in the RAM 104.

In S15 the CPU 101 performs a triangular pyramid interpolation process (FIG. 5 and FIG. 6) and subsequently ends the color conversion process.

On the other hand, if the CPU 101 determines that the Fc has been set (S11: YES), then in S12 the CPU 101 reads data of the RGB-CMYK conversion table $T_{RGB-CMYK}$ of FIG. 2(b) from the hard disc drive 102 and stores this data in the RAM 104.

In S13 the CPU 101 performs a cube interpolation process (FIG. 10) and subsequently ends the color conversion process.

Next, the triangular pyramid interpolation process executed in S15 will be described with reference to FIG. 5.

Figure 5:
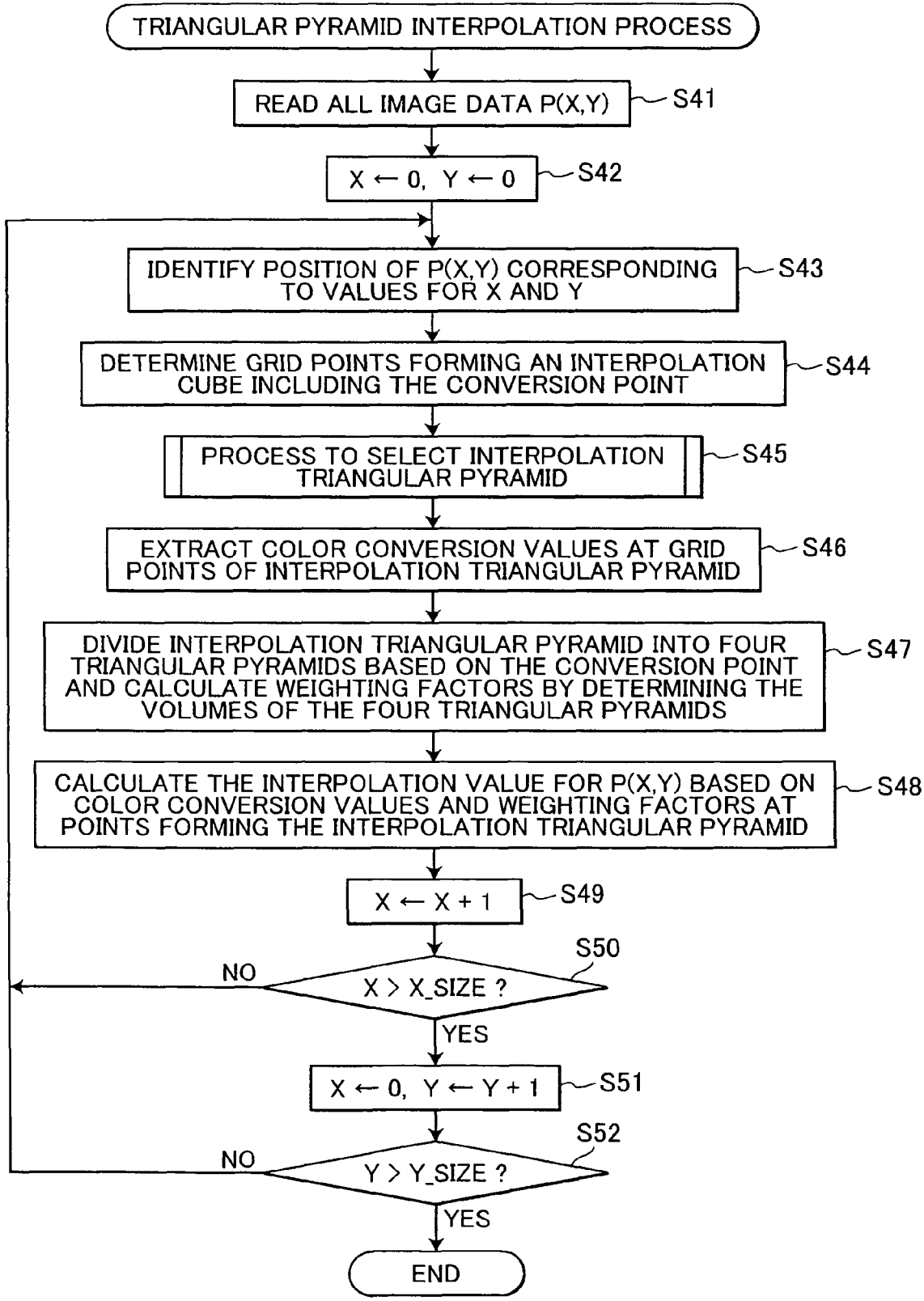
FIG. 5 is a flowchart showing steps in a triangular pyramid interpolation in FIG. 4.

FIG. 5 is a flowchart showing the steps in the triangular pyramid interpolation process.

It is noted that a plurality of pixels are arranged in the horizontal direction and the vertical direction in one image inputted from the input device. Each pixel is identified by P(X,Y), wherein X is the horizontal coordinate of the subject pixel and Y is the vertical coordinate of the pixel. The value X is one of the values 0, 1, 2, ..., and X_SIZE, and the value Y is one of the values 0, 1, 2, ..., and Y_SIZE. The value X_SIZE is the total number of pixels arranged in the horizontal direction of the image, while the value Y_SIZE is the total number of pixels arranged in the vertical direction of the image. The total number of pixels in the entire image is therefore equal to X_SIZE×Y_SIZE.

A plurality of input image data sets (Rin, Gin, Bin) for all the pixels P(x,y) are inputted into the personal computer 100 together with data of X_SIZE and Y_SIZE. It is noted that the values X_SIZE and Y_SIZE will differ according to the size of the image inputted.

At the beginning of the triangular pyramid interpolation process, in S41 the CPU 101 reads from the hard disc drive 102 a plurality of sets of input image data P(X,Y) indicative of all the pixels in the image, and stores this data in the RA 104. Each set of image data P(X,Y) includes three color components defined by R (red), G (green), and B (blue). In other words, each set of input image data P(X,Y) includes a set of values (Rin, Gin, Bin), wherein Rin, Gin, and Bin are integers greater than or equal to zero (0) and smaller than or equal to 255. Each input image data set P(X,Y) will be referred to as "an input image data set P(Rin, Gin, Bin)" hereinafter.

In S42 the CPU 101 initializes the coordinate values X and Y of the image data to zero.

In S43 the CPU 101 determines the position of color represented by one-set of input image data P(X,Y) (P(Rin, Gin, Bin)) in the RGB color space for the input device. The CPU 101 determines the position of the color based on the coordinates (Rin, Gin, Bin). The position of the input image data set P(Rin, Gin, Bin) in the RGB color space for the input device will be referred to as a "conversion point P(Rin, Gin, Bin)" hereinafter.

In S44 the CPU 101 determines, in the RGB color space for the input device, a unit interpolation cube that is defined by eight grid points that are located adjacent to one another, that has a unit length L (=256/m) along each of the R-, G-, and B-axes, and that includes the conversion point P(Rin, Gin, Bin) therein.

Figure 7:
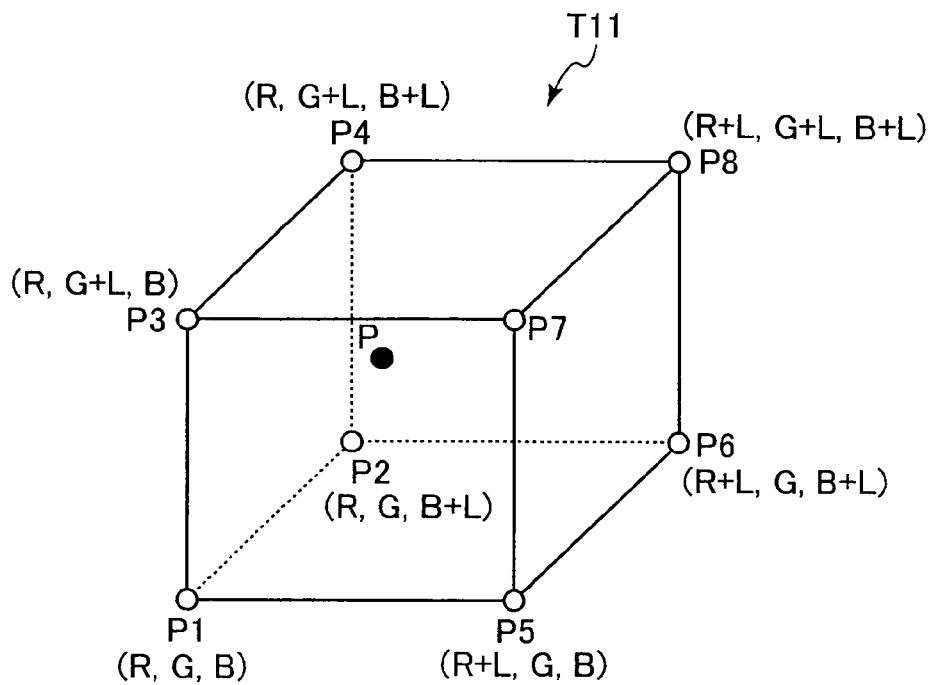
FIG. 7 is an explanatory diagram illustrating triangular pyramid interpolation.

It is now assumed that the conversion point P(Rin, Gin, Bin) exists in the RGB color space as shown in FIG. 7. In this case, a cube formed by the grid points P1, P2, P3, P4, P5, P6, P7, and P8 is selected as a unit interpolation cube T11. The lengths between grid points P1 and P2, P1 and P5, P2 and P6, and P5 and P6, P1 and P3, P2 and P4, P5 and P7, P6 and P8, P3 and P7, P3 and P4, P4 and P6, and P7 and P8 are all equal to the unit length L (=255/m).

It is noted that a line segment connecting the grid points P1 and P8 extends in a direction in which the gray axis extends. More specifically, if the red, green, and blue components of the grid point P1 are equal to one another and the red, green, and blue components of the grid point P8 are equal to one another, the line segment connecting the grid points P1 and P8 is located on the gray axis. In other words, the line segment connecting the grid points P1 and P8 extends along the gray axis. On the other hand, if the red, green, and blue components of the grid point P1 are not equal to one another and the red, green, and blue components of the grid point P8 are not equal to one-another, the line segment connecting the grid points P1 and P8 is not located on the gray axis, but extends parallel with the gray axis.

It is noted that when the differences |(Rin−Gin)|, |(Gin−Bin)|, and |(Bin−Rin)| between the respective color components Rin, Gin, Bin of the conversion point P(Rin, Gin, Bin) are all smaller than or equal to the unit length L (=255/m), the conversion point P is located within a unit interpolation cube, whose grid points P1 and P8 are located on the gray axis. For example, when the conversion point P is located exactly on the gray axis and therefore the differences |(Rin−Gin)|, |(Gin−Bin)|, and |(Bin−Rin)| between the respective color components Rin, Gin, Bin of the conversion point P are all equal to zero (0), the conversion point P is located within the interpolation cube, whose grid points P1 and P8 are located on the gray axis. On the other hand, when at least one of the differences |(Rin−Gin)|, |(Gin−Bin)|, and |(Bin−Rin)| between the respective color components Rin, Gin, Bin of the conversion point P is greater than the unit length L (=255/m), the conversion point P is located within another unit interpolation cube, whose grid points P1 and P8 are not located on the gray axis.

In S45 the CPU 101 performs a process to select an interpolation triangular pyramid.

Next, the interpolation triangular pyramid selecting process of S45 will be described with reference to FIG. 6.

Figure 6:
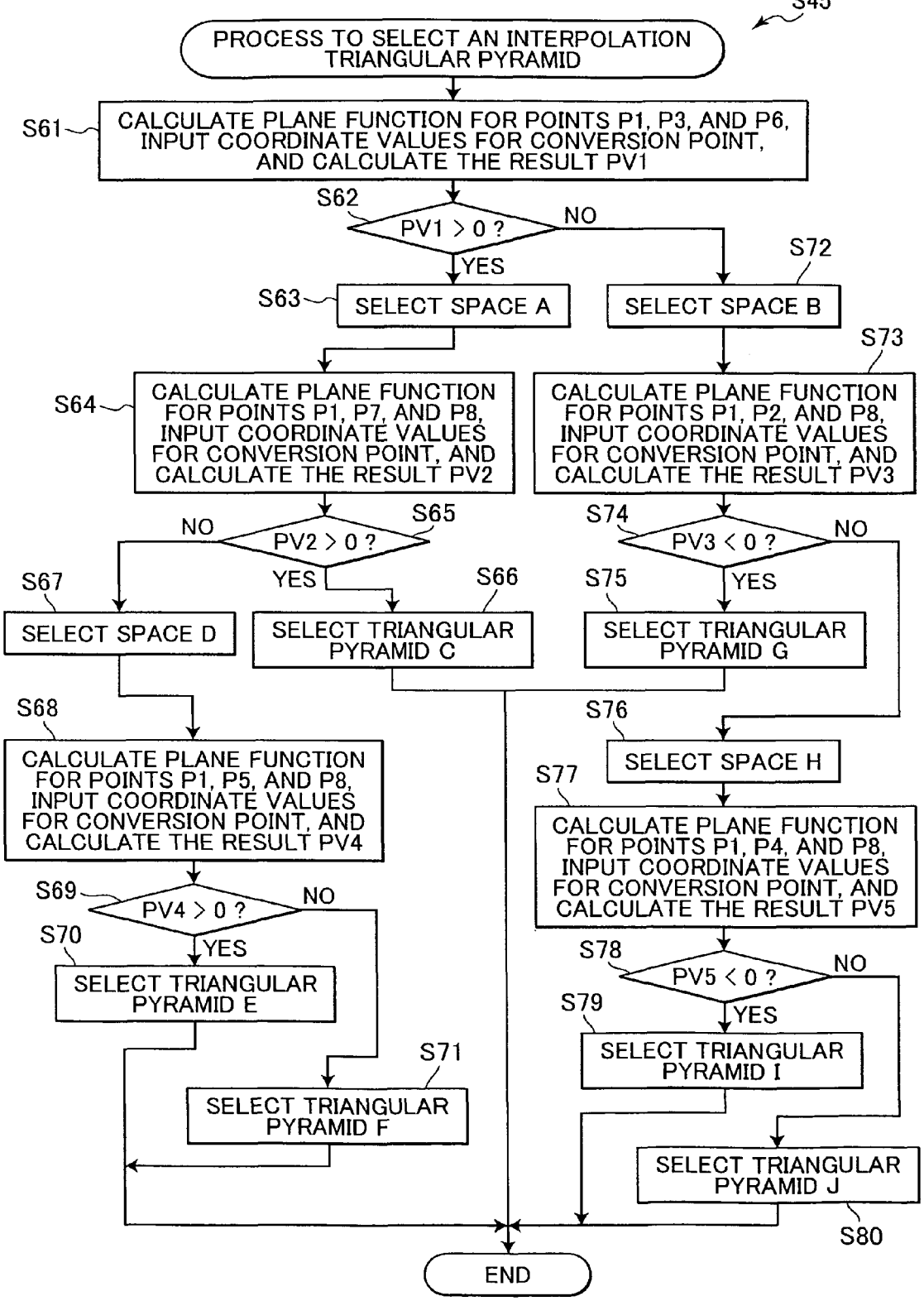
FIG. 6 is a flowchart showing steps in a process to select an interpolation triangular pyramid in FIG. 5.

FIG. 6 is a flowchart showing steps in the process to select an interpolation triangular pyramid.

It is noted that generally, a function F(R,G,B), indicative of an arbitrary plane F on which three points are located in the RGB three-dimensional color space, is expressed by the following formula (1):

$$F(R,G,B) = a \times R + b \times G + c \times B + d \quad (1)$$

wherein the values R, G, and B are variables defined in the RGB color space, and a, b, c, and d are constants determined by the coordinates of the three points.

The plane divides the RGB color space into two spaces: a first space located on one side of the plane; and a second space located on the other side of the plane.

It is known that an arbitrary point (R, G, B) is located exactly on the plane defined by the function F(R, G, B) if the value of the function F(R,G,B) becomes equal to zero (0) when the coordinate values R, G, B in the arbitrary point (R, G, B) are substituted for the values R, G, B in the function F(R, G, B). It is also known that another arbitrary point (R, G, B) is located on one side of the plane defined by the function F (R, G, B) if the value of the function F(R,G,B) becomes greater than zero (0) when the coordinate values R, G, B of the arbitrary point (R, G, B) are substituted for the values R, G, B in the function F(R, G, B). It is also known that still another arbitrary point (R, G, B) is located on the other side of the plane defined by the function F(R, G, B) if the value of the function F(R,G,B) becomes smaller than zero (0) when the coordinate values R, G, B of the arbitrary point (R, G, B) are substituted for the values R, G, B in the function F(R, G, B).

At the beginning of the process of FIG. 6, the CPU 101 performs a process in S61 to calculate a function F1(R,G,B) indicative of a plane F1, on which the points P1, P3, and P6 are located in FIG. 7. The CPU 101 determines the function F1(R,G,B) by determining the constants a, b, c, and d in the formula (1) based on the coordinates of the points P1, P3, and P6.

After determining the plane function F1(R,G,B), the CPU 101 substitutes the coordinate values (Rin, Gin, Bin) of the conversion point P(Rin, Gin, Bin) for the variables R, G, and B in the plane function F1(R, G, B), and determines a result PV1 (=F1(Rin,Gin,Bin)).

In S62 the CPU 101 determines whether or not the result PV1 is greater than zero (0).

Figure 8A:
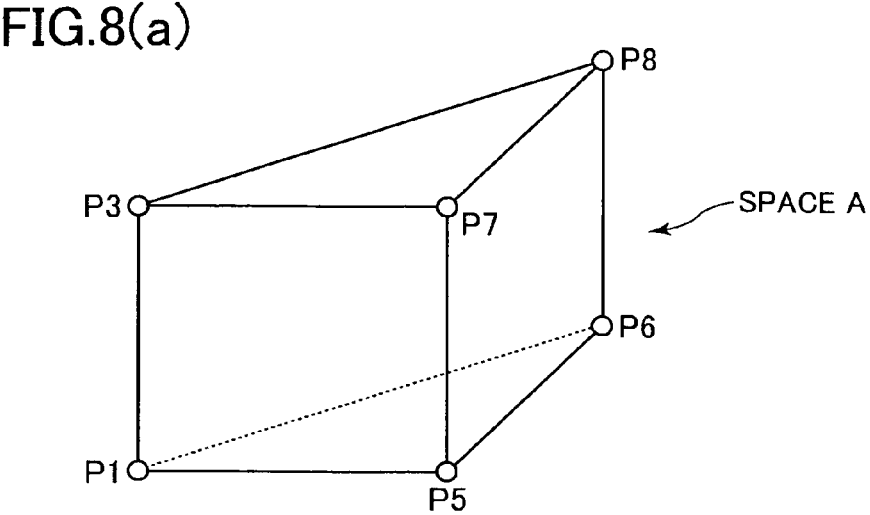
FIGS. 8(a)-8(j) are explanatory diagrams showing how to divide the cube of FIG. 7 into a plurality of spaces to determine one triangular pyramid.

If the CPU 101 determines that the result PV1 is greater than zero (0) (S62: YES), then in S63 the CPU 101 determines that the conversion point P(Rin,Gin,Bin) is located within a space A shown in FIG. 8(a) that is defined by the points P1, P3, P5, P6, P7, and P9.

In S64 the CPU 101 determines a plane function F2(R,G,B) indicative of another plane F2, on which the points P1, P7, and P8 are located in FIG. 7. The CPU 101 determines the plane function F2(R,G,B) by determining the constants a, b, c, and d in the formula (1) based on the coordinate values of the points P1, P7, and P8. The CPU 101 substitutes the coordinate values Rin, Gin, Bin in the conversion point P(Rin, Gin, Bin) for the variables R, G, and B in the plane function F2(R, G, B), thereby determining a result PV2 (=F2(Rin,Gin,Bin)).

In S65 the CPU 101 determines whether the result PV2 is greater than zero (0).

Figure 8B:
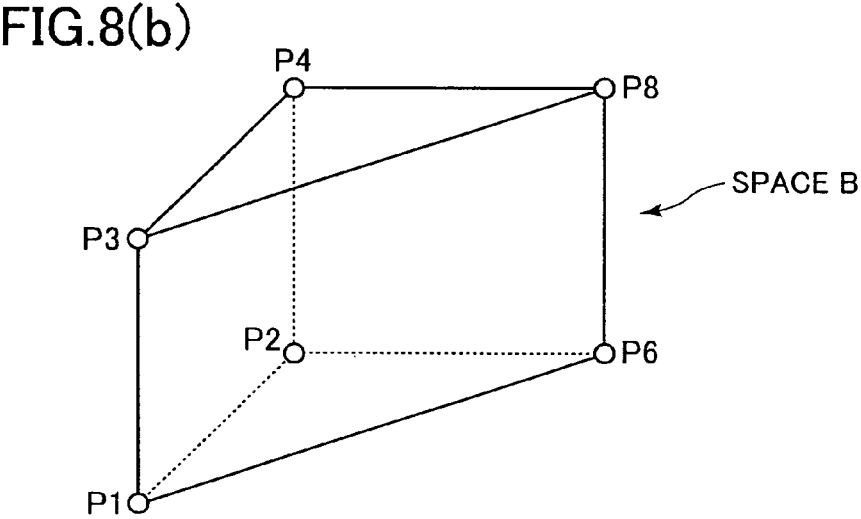
Figure 8C:
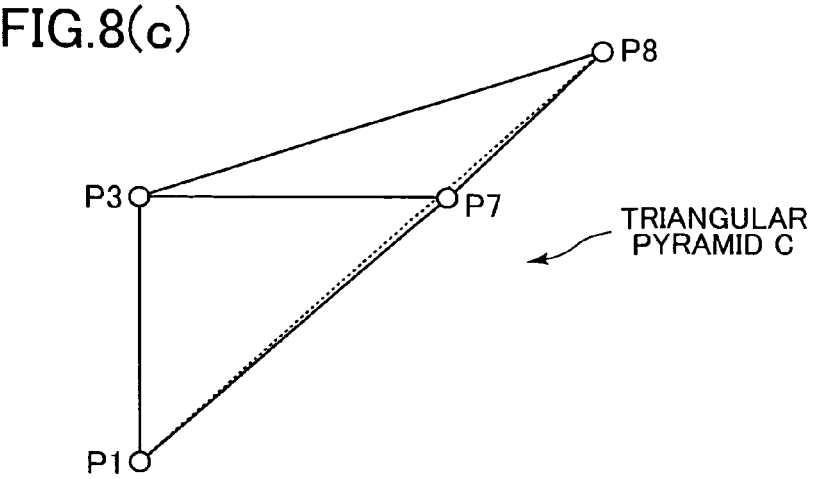

If the CPU 101 determines that the result PV2 is greater than zero (0) (S65: YES), then in S66 the CPU 101 determines that the conversion point P(Rin, Gin, Bin) is located within a triangular pyramid C formed by points P1, P3, P7, and P8 shown in FIG. 8(c). The CPU 101 determines that the triangular pyramid C will be used as an interpolation triangular pyramid for the interpolation calculation of the conversion point P(Rin, Gin, Bin), and ends the process of S45.

Figure 8D:
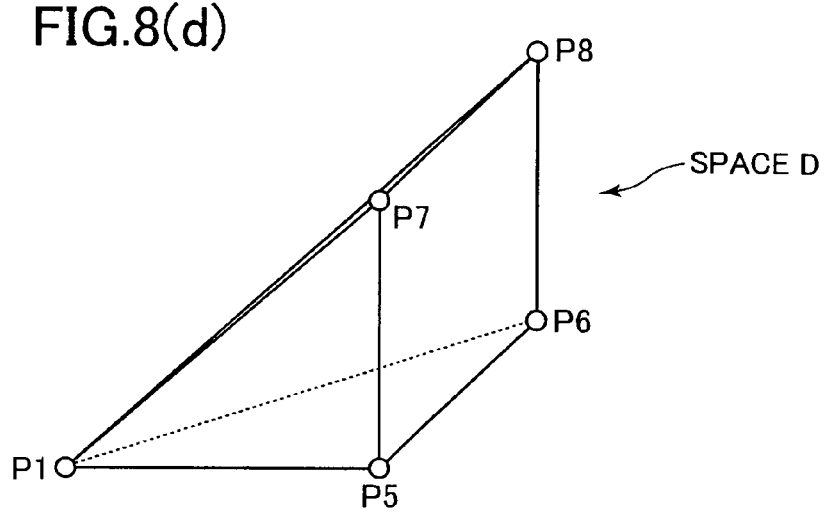

On the other hand, if the CPU 101 determines that the result PV2 is not greater than zero (0) (S65: NO), then in S67 the CPU 101 determines that the conversion point (Rin, Gin, Bin) is located within a space D formed by the points P1, P5, P6, P7, and P8 as shown in FIG. 8(d).

Next, in S68, the CPU 101 determines a plane function F4(R,G,B) indicative of another plane F4, on which the points P1, P5, and P8 are located. The CPU 101 determines the plane function F4(R,G,B) by determining the constants a, b, c, and d in the formula (1) based on the coordinate values of the points P1, P5, and P8. The CPU 101 substitutes the coordinate values Rin, Gin, Bin in the conversion point P(Rin, Gin, Bin) for the variables R, G, and B in the plane function F4(R, G, B), thereby determining a result PV4 (=F4(Rin,Gin,Bin)).

In S69 the CPU 101 determines whether the result PV4 is greater than zero (0).

Figure 8E:
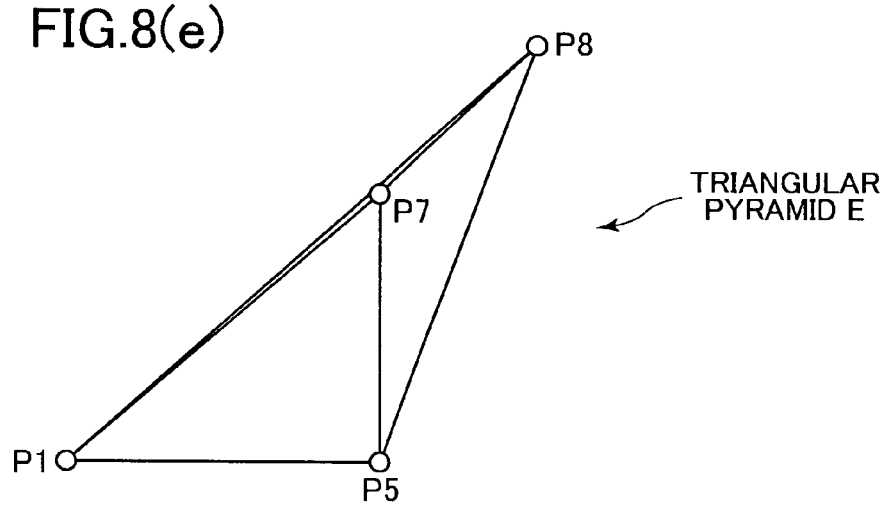

If the CPU 101 determines that the result PV4 is greater than zero (0) (S69: YES), then in S70 the CPU 101 determines that the conversion point P(Rin, Gin, Bin) is located within a triangular pyramid E formed by points P1, P5, P7, and P8 shown in FIG. 8(e). The CPU 101 determines that the triangular pyramid E will be used as an interpolation triangular pyramid for the interpolation calculation of the conversion point P(Rin, Gin, Bin), and ends the process of S45.

Figure 8F:
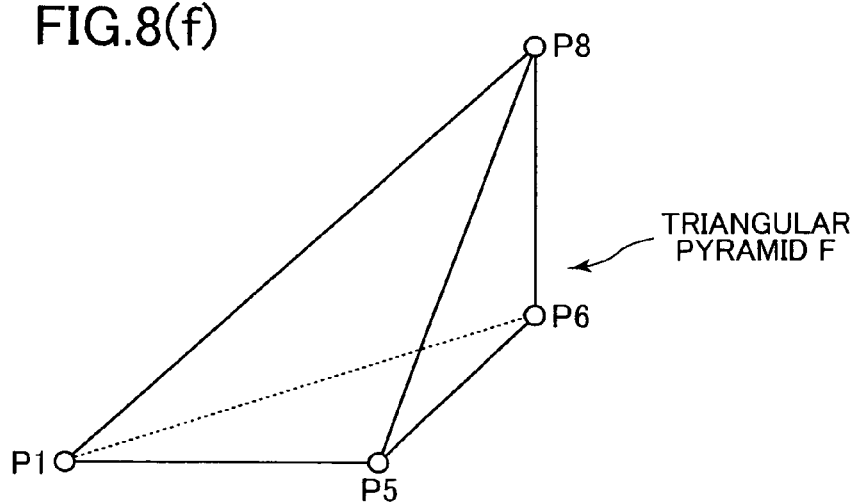

On the other hand, if the CPU 101 determines that the result PV4 is not greater than zero (0) (S69: NO), then in S71 the CPU 101 determines that the conversion point P(Rin, Gin, Bin) is located within a triangular pyramid F formed by points P1, P5, P6, and P0 shown in FIG. 8(f). The CPU 101 determines that the triangular pyramid F will be used as an interpolation triangular pyramid for the interpolation calculation of the conversion point P(Rin, Gin, Bin), and ends the process of S45.

On the other hand, if the CPU 101 determines that the result PV1 is not greater than zero (0) (S62: NO), then in S72 the CPU 101 determines that the conversion point P(Rin,Gin,Bin) is located within a space B shown in FIG. 8(b) that is defined by the points P1, P2, P3, P4, P6, and P8.

In S73 the CPU 101 determines a plane function F3(R,G,B) indicative of a plane F3, on which the points P1, P2, and P8 are located. The CPU 101 determines the plane function F3(R,G,B) by determining the constants a, b, c, and d in the formula (1) based on the coordinate values of the points P1, P2, and P8. The CPU 101 substitutes the coordinate values Rin, Gin, Bin in the conversion point P(Rin, Gin, Bin) for the variables R, G, and B in the plane function F3(R, G, B), thereby determining a result PV3 (=F3(Rin,Gin,Bin)).

In S74 the CPU 101 determines whether the result PV3 is smaller than zero (0).

Figure 8G:
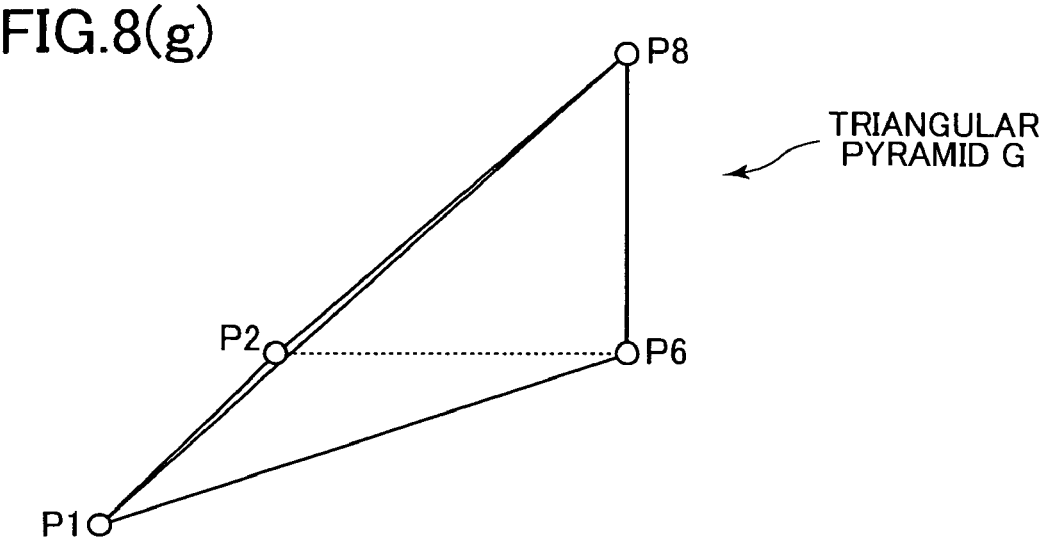

If the CPU 101 determines that the result PV3 is smaller than zero (0) (S74: YES), then in S75 the CPU 101 determines that the conversion point P(Rin, Gin, Bin) is located within a triangular pyramid G formed by points P1, P2, P6, and P8 shown in FIG. 8(g). The CPU 101 determines that the triangular pyramid G will be used as an interpolation triangular pyramid for the interpolation calculation of the conversion point P(Rin, Gin, Bin), and ends the process of S45.

Figure 8H:
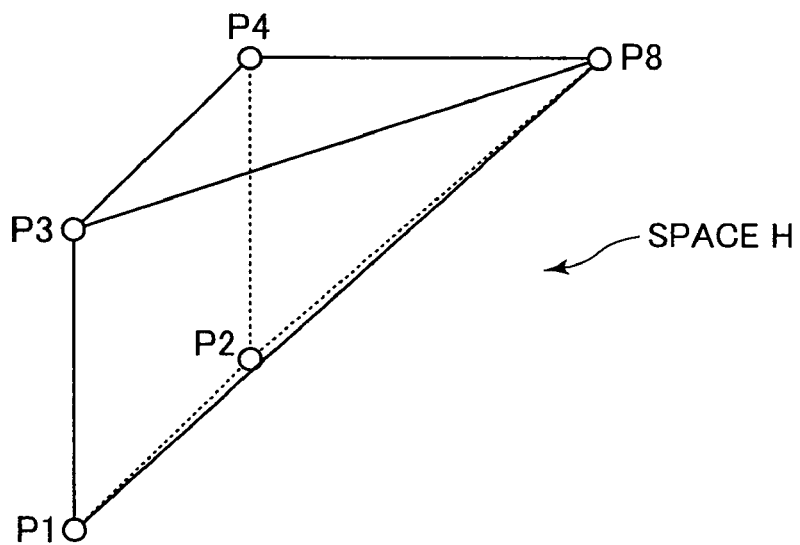
Figure 8I:
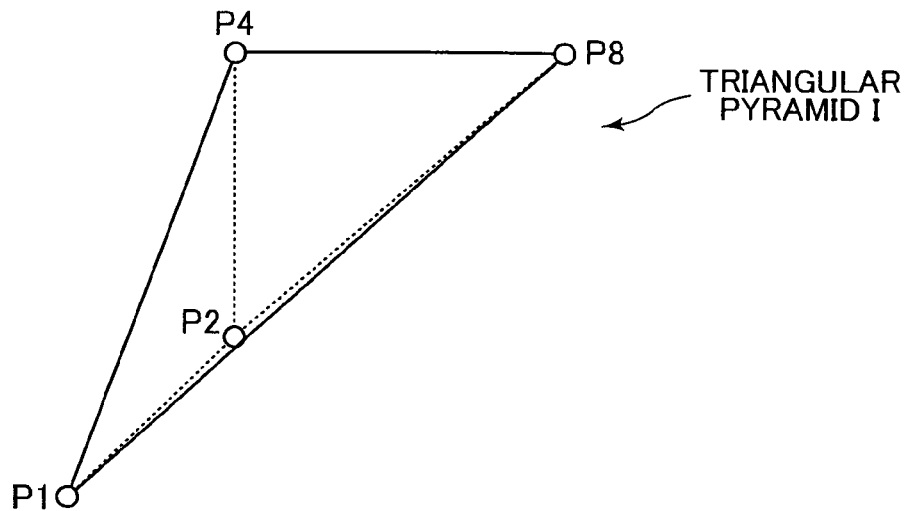
Figure 8J:
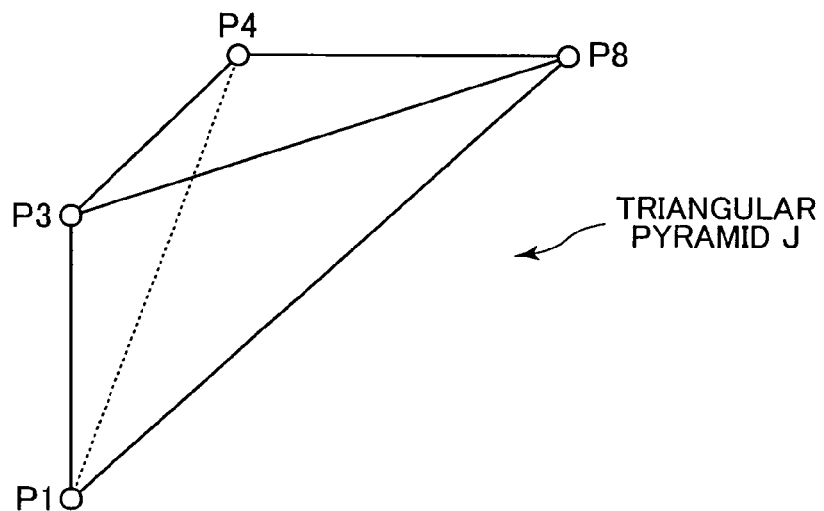

On the other hand, if the CPU 101 determines that the result PV3 is not smaller than zero (0) (S74: NO), then in S76 the CPU 101 determines that the conversion point (Rin, Gin, Bin) is located within a space H formed by the points P1, P2, P3, P4, and P8 as shown in FIG. 8(h).

Next, in S77, the CPU 101 determines a plane function F5(R,G,B) indicative of another plane F5, on which the points P1, P4, and P8 are located. The CPU 101 determines the plane function F5(R,G,B) by determining the constants a, b, c, and d in the formula (1) based on the coordinate values of the points P1, P4, and P8. The CPU 101 substitutes the coordinate values Rin, Gin, Bin in the conversion point P(Rin, Gin, Bin) for the variables R, G, and B in the plane function F5(R, G, B), thereby determining a result PV5 (=F5(Rin,Gin,Bin)).

In S78 the CPU 101 determines whether the result PV5 is smaller than zero (0).

If the CPU 101 determines that the result PV5 is smaller than zero (0) (S78: YES), then in S79 the CPU 101 determines that the conversion point P(Rin, Gin, Bin) is located within a triangular pyramid I formed by points P1, P2, P4, and P8 shown in FIG. 8(*i*). The CPU 101 determines that the triangular pyramid I will be used as an interpolation triangular pyramid for the interpolation calculation of the conversion point P(Rin, Gin, Bin), and ends the process of S45.

On the other hand, if the CPU 101 determines that the result PV5 is not smaller than zero (0) (S78: NO), then in S80 the CPU 101 determines that the conversion point P(Rin, Gin, Bin) is located within a triangular pyramid J formed by points P1, P3, P4, and P8 shown in FIG. 8(*j*). The CPU 101 determines that the triangular pyramid J will be used as an interpolation triangular pyramid for the interpolation calculation of the conversion point P(Rin, Gin, Bin), and ends the process of S45.

Figure 9:
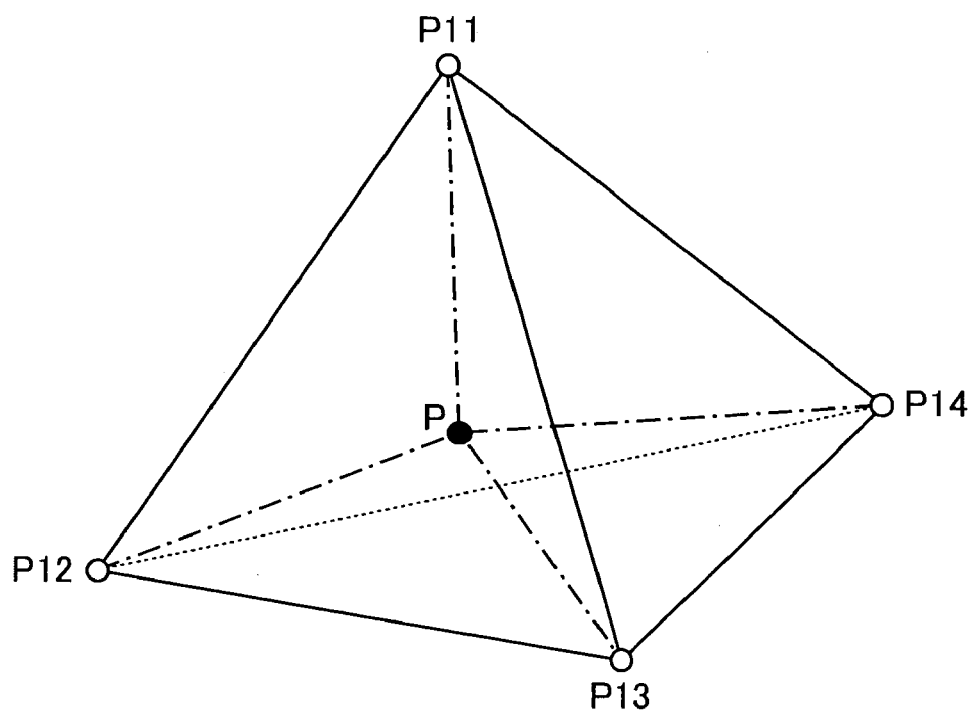
FIG. 9 is an explanatory diagram showing how to calculate weighting factors for the triangular pyramid interpolation.

As shown in FIG. 6(*c*), FIG. 8(*e*), FIG. 9(*f*), FIG. 8(*g*), FIG. 8(*i*), and FIG. 8(*j*), all the triangular pyramids C, E, F, G, I, and J have, as their edges, the same line segment that connects the grid points P1 and P8. The line segment connecting the grid points P1 and P8 is aligned with or located on the gray axis when the differences |(Rin−Gin)|, |(Gin−Bin)|, and |(Bin−Rin)| between the respective color components Rin, Gin, Bin of the conversion point P(Rin, Gin, Bin) are all smaller than or equal to the unit length L (=255/m). For example, the line segment connecting the grid points P1 and P8 is aligned with or located on the gray axis when the conversion point P is located on the gray axis and therefore when the differences |(Rin−Gin)|, |(Gin−Bin)|, and |(Bin−Rin)| between the respective color components Rin, Gin, Bin of the conversion point P(Rin, Gin, Bin) are all equal to zero (0). On the other hand, the line segment connecting the grid points P1 and P8 is not aligned with the gray axis but extends parallel with the gray axis when at least one of the differences |(Rin−Gin)|, |(Gin−Bin)| and |(Bin−Rin)| between the respective color components Rin, Gin, Bin of the conversion point P(Rin, Gin, Bin) is greater than the unit length L (=255/m).

In this way, in S45, the CPU 101 determines an interpolation triangular pyramid C, E, F, G, I, or J, within which the conversion point P(Rin, Gin, Bin) is located.

It is now assumed that in this example, an interpolation triangular pyramid (C, E, F, G, I, or J), within which the conversion point P(Rin, Gin, Bin) is located and which is determined in S45, is defined by four grid points P11, P12, P13, and P14 as shown in FIG. 9.

When the interpolation triangular pyramid is determined in S45, the process proceeds to S46 (FIG. 5).

In S46 the CPU 101 extracts from the RGB-RGB conversion table $T_{RGB-RGB}$ of FIG. 2(*a*), four sets of RGB parameters (R',G',B') that are stored in correspondence with the four grid points P11, P12, P13, and P14 forming the determined interpolation triangular pyramid.

Hereinafter a set of RGB parameters (R',G',B') at each grid point Pn, where n is 11, 12, 13, or 14 in this example, will be described as (Rn',Gn',Bn'), such as (R11',G11',B11') for point P11 and (R12',G12',B12') for point P12.

In S47, the CPU 101 calculates weighting factors at the grid points P11, P12, P13, and P14.

The manner how to calculate weighting factors will be described below with reference to FIG. 9.

As shown in FIG. 9, the interpolation triangular pyramid is first divided into four triangular pyramids each having the conversion point P(Rin, Gin, Bin) as its apex.

It is noted the volume of the interpolation triangular pyramid, which is defined by points P11, P12, P13, and P14, is indicated by "V(P11, P12, P13, P14)".

A weighting factor W11 for the point P11 is calculated based on the volume V(P12, P13, P14, P) of a triangular pyramid that is formed by points P12, P13, P14, and P(Rin, Gin, Bin) as expressed by the following equation (2):

$$W11=[V(P12,P13,P14,P)]/[V(P11,P12,P13,P14)] \quad (2)$$

A weighting factor W12 for the point P12 is calculated based on the volume V(P11, P13, P14, P) of a triangular pyramid that is formed by points P11, P13, P14, and P(Rin, Gin, Bin) as expressed by the following equation (3):

$$W12=[V(P11,P13,P14,P)]/[V(P11,P12,P13,P14)] \quad (3)$$

A weighting factor W13 for the point P13 is calculated based on the volume V(P11, P12, P14, P) of a triangular pyramid that is formed by points P11, P12, P14, and P(Rin, Gin, Bin) as expressed by the following equation (4):

$$W13=[V(P11,P12,P14,P)]/[V(P11,P12,P13,P14)] \quad (4)$$

A weighting factor W14 for the point P14 is calculated based on the volume V(P11, P12, P13, P) of a triangular pyramid that is formed by points P11, P12, P13, and P(Rin, Gin, Bin) as expressed by the following equation (5):

$$W14=[V(P11,P12,P13,P)]/[V(P11,P12,P13,P14)] \quad (5)$$

In S48 the CPU 101 uses the weighting factors W11-W14 and the four sets of RGB parameters (R11', G11', B11'), (R12', G12', B12'), (R13', G13', B13'), and (R14', G14', B14'), which are stored in the table $T_{RGB-RGB}$ (FIG. 2(*a*)) for the grid points P11, P12, P13, and P14, to calculate the corrected image data set (Rout, Gout, Bout) for the conversion point P(Rin, Gin, Bin) according to the following equations (6)-(8):

$$Rout=W11\times R11'+W12\times R12'+W13\times R13'+W14\times R14' \quad (6)$$

$$Gout=W11\times G11'+W12\times G12'+W13\times G13'+W14\times G14' \quad (7)$$

$$Bout=W11\times B11'+W12\times B12'+W13\times B13'+W14\times B14' \quad (8)$$

After completing the process in S48, the CPU 101 increments X in S49.

In S50, the CPU 101 determines whether the value of X is greater than X_SIZE, which is the maximum size of the image along the X direction.

If the CPU 101 determines that the value of X is less than or equal to X_SIZE (S50: NO), then the CPU 101 returns to S43 and repeats the process described above.

On the other hand, if the CPU 101 determines that the value of X is greater than X_SIZE (S50:YES), then in S51 the CPU 101 sets X to zero and increments Y.

Next, the CPU 101 determines in S52 whether the value of Y is greater than Y_SIZE, which is the maximum size of the image along the Y direction.

If the CPU 101 determines that the value of Y is less than or equal to Y_SIZE (S52: NO), then the CPU 101 returns to S43 and repeats the aforementioned processes.

On the other hand, if the CPU 101 determines that the value of Y is greater than Y_SIZE (S52: YES), then the CPU 101 ends the triangular pyramid interpolation process.

When the above-described process of S15 is completed, the input image data sets P(X,Y)=(Rin,Gin,Bin) for all the X_SIZE×Y_SIZE number of pixels are converted into corrected image data sets (Rout, Gout, Bout) that are defined in the RGB color space for the printer 200, which is different from the original RGB color space for the input device.

Next, the cube interpolation process executed in S13 will be described with reference to FIG. 10.

Figure 10:
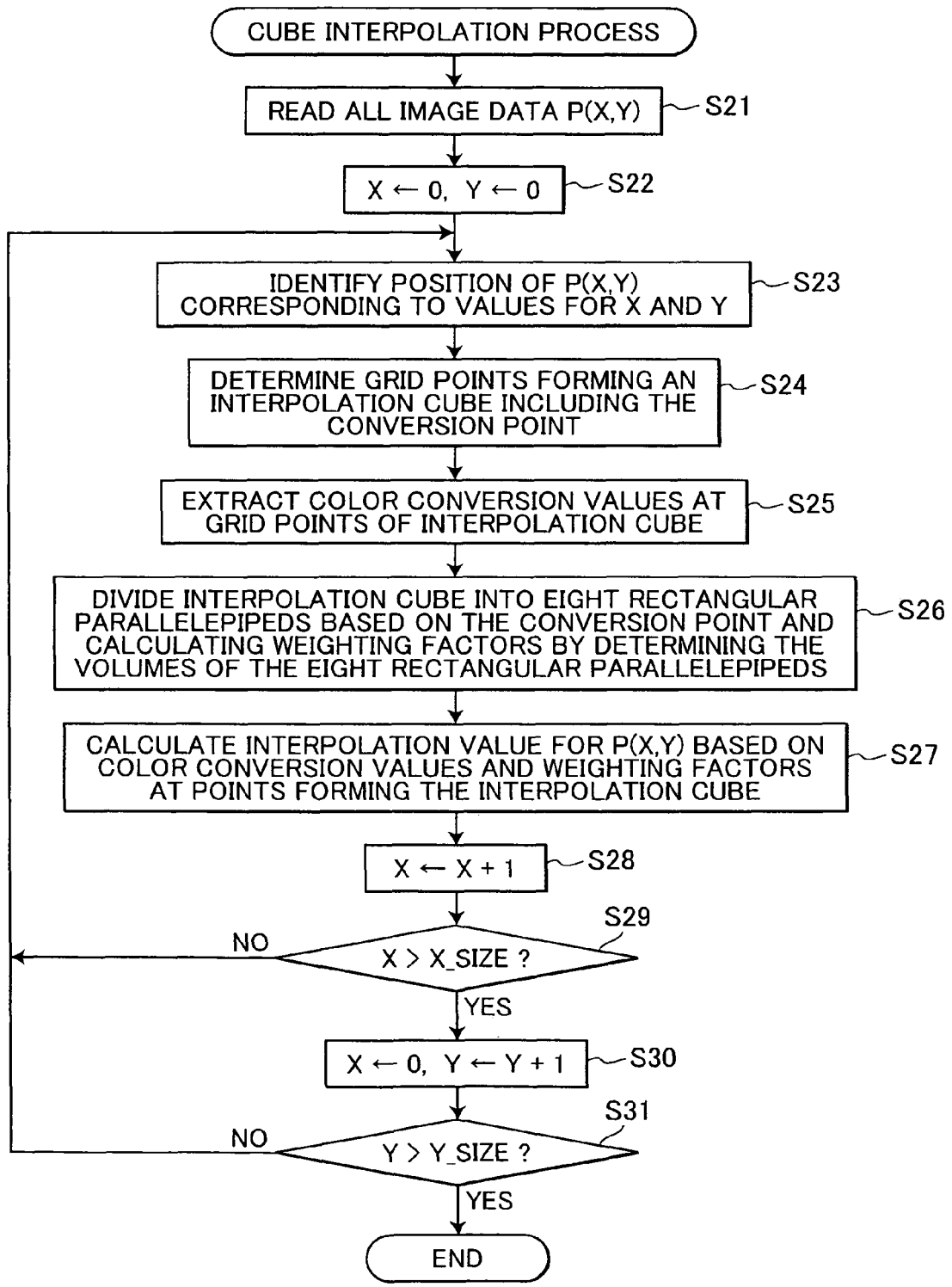
FIG. 10 is a flowchart showing steps in a cube interpolation process in FIG. 4.

FIG. 10 is a flowchart showing the steps in the cube interpolation process.

At the beginning of the cube interpolation process, in S21 the CPU 101 reads from the hard disc drive 102 a plurality of sets of corrected image data P(X,Y) indicative of all the pixels in the image, and stores this data in the RAM 104. Each set of corrected image data P(X,Y) includes three color components defined by R (red), G (green), and B (blue). In other words, each set of corrected image data P(X,Y) includes a set of values (Rout, Gout, Bout), wherein Rout, Gout, and Bout are integers greater than or equal to zero (0) and smaller than or equal to 255. Each corrected image data set P(X,Y) will be referred to as "a corrected image data set P(Rout, Gout, Bout)" hereinafter.

In S22 the CPU 101 initializes the coordinate values X and Y of the corrected image data to zero.

In S23 the CPU 101 determines the position of color represented by one set of corrected image data P(X,Y) (P(Rout, Gout, Bout)) in the RGB color space for the printer 200. The CPU 101 determines the position of the color based on the coordinates (Rout, Gout, Bout). The position of the input image data set P(Rout, Gout, Bout) in the RGB color space for the printer 200 will be referred to as a "conversion point P(Rout, Gout, Bout)" hereinafter.

In S24 the CPU 101 determines, in the RGB color space for the printer 200, a unit interpolation cube, which is defined by eight grid points that are located adjacent to one another, which has a unit length L (=256/m) along each of the R-, G-, and B-axes, and which includes the conversion point P(Rout, Gout, Bout) therein.

It is now assumed that the conversion point P(Rout, Gout, Bout) exists in the RGB color space for the printer 200 as shown in FIG. 11. In this example, a cube formed by the grid points P1, P2, P3, P4, P5, P6, P7, and P6 is selected as a unit interpolation cube T11. The lengths between grid points P1 and P2, P1 and P5, P2 and P6, and P5 and P6, P1 and P3, P2 and P4, P5 and P7, P6 and P8, P3 and P7, P3 and P4, P4 and P8, and P7 and P8 are all equal to the unit length L (=255/m).

In S25 the CPU 101 extracts from the RGB-CMYK conversion table $T_{RGB-CMYK}$ of FIG. 2(*b*), eight sets of CMYK parameters (C, M, Y, K) that are stored in correspondence with the eight grid points P1, P2, P3, P4, P5, P6, P7, and P8.

Hereinafter a set of CMYK parameters (C, M, Y, K) at each grid point Pn, where n is 1, 2, 3, 4, 5, 6, 7, or 8 in this example, will be described as (Cn, Mn, Yn, Kn), such as (C1, M1, Y1, K1) for point P1 and (C2, M2, Y2, K2) for point P2.

In S26, the CPU 101 calculates weighting factors at the grid points P1, P2, P3, P4, P5, P6, P7, and P8.

The manner how to calculate weighting factors will be described below with reference to FIG. 11.

As shown in FIG. 11, the unit interpolation cube T11 is first divided into eight rectangular parallelepipeds each of which has a diagonal line connecting one of the grid points P1-P8 to the conversion point P(Rout, Gout, Bout).

It is noted the volume of the unit interpolation cube, which is defined by points P1, P2, P3, P4, P5, P6, P7, and P8 and therefore which has a diagonal line connecting the grid points P1 and P8, is indicated by "V(P1, P8)".

A weighting factor W1 for the point P1 is calculated based on the volume V(P8, P) of a rectangular parallelepiped that has a diagonal line connecting the grid point P8 and the conversion point P(Rout, Gout, Bout) as expressed by the following equation (9):

$$W1=[V(P8,P)]/[V(P1,P8)] \quad (9)$$

A weighting factor W2 for the point P2 is calculated based on the volume V(P7, P) of another rectangular parallelepiped that has a diagonal line connecting the grid point P7 and the conversion point P(Rout, Gout, Bout) as expressed by the following equation (10):

$$W2=[V(P7,P)]/[V(P1,P8)] \quad (10)$$

A weighting factor W3 for the point P3 is calculated based on the volume V(P6, P) of a rectangular parallelepiped that has a diagonal line connecting the grid point P6 and the conversion point P(Rout, Gout, Bout) as expressed by the following equation (11):

$$W3=[V(P6,P)]/[V(P1,P8)] \quad (11)$$

A weighting factor W4 for the point P4 is calculated based on the volume V(P5, P) of another rectangular parallelepiped that has a diagonal line connecting the grid point P5 and the conversion point P(Rout, Gout, Bout) as expressed by the following equation (12):

$$W4=[V(P5,P)]/[V(P1,P8)] \quad (12)$$

A weighting factor W5 for the point P8 is calculated based on the volume V(P4, P) of a rectangular parallelepiped that has a diagonal line connecting the grid point P4 and the conversion point P(Rout, Gout, Bout) as expressed by the following equation (13):

$$W5=[V(P4,P)]/[V(P1,P8)] \quad (13)$$

A weighting factor W6 for the point P6 is calculated based on the volume V(P3, P) of another rectangular parallelepiped that has a diagonal line connecting the grid point P3 and the conversion point P(Rout, Gout, Bout) as expressed by the following equation (14):

$$W6=[V(P3,P)]/[V(P1,P8)] \quad (14)$$

A weighting factor W7 for the point P7 is calculated based on the volume V(P2, P) of a rectangular parallelepiped that has a diagonal line connecting the grid point P2 and the conversion point P(Rout, Gout, Bout) as expressed by the following equation (15):

$$W7=[V(P2,P)]/[V(P1,P8)] \quad (15)$$

A weighting factor W8 for the point P8 is calculated based on the volume V(P1, P) of another rectangular parallelepiped that has a diagonal line connecting the grid point P1 and the conversion point P(Rout, Gout, Bout) as expressed by the following equation (16):

$$W8=[V(P1,P)]/[V(P1,P8)] \quad (16)$$

In S27 the CPU 101 uses the weighting factors W1-W8 and the eight sets of CMYK parameters (C1, M1, Y1, K1), (C2, M2, Y2, K2), (C3, M3, Y3, K3), (C4, M4, Y4, K4), (C5, M5, Y5, K5), (C6, M6, Y6, K6), (C7, M7, Y7, K7), and (C8, M8, Y8, K8), which are stored in the table $T_{RGB-CMYK}$ (FIG. 2(*b*)) for the grid points P1, P2, P3, P4, P5, P6, P7, and P8, to calculate the output image data set (Cout, Mout, Yout, Kout) for the conversion point P(Rout, Gout, Bout) according to the following equations (17)-(20):

$$Cout=W1 \times C1+W2 \times C2+W3 \times C3+W4 \times C4+W5 \times C5+W6 \times C6+W7 \times C7+W8 \times C8 \quad (17)$$

$$Mout=W1 \times M1+W2 \times M2+W3 \times M3+W4 \times M4+W5 \times M5+W6 \times M6+W7 \times M7+W8 \times M8 \quad (18)$$

$$Yout=W1 \times Y1+W2 \times Y2+W3 \times Y3+W4 \times Y4+W5 \times Y5+W6 \times Y6+W7 \times Y7+W8 \times Y8 \quad (19)$$

$$Kout=W1 \times K1+W2 \times K2+W3 \times K3+W4 \times K4+W5 \times K5+W6 \times K6+W7 \times K7+W8 \times K8 \quad (20)$$

After completing the process in S27, the CPU 101 increments X in S28.

In S29, the CPU 101 determines whether the value of X is greater than X_SIZE.

If the CPU 101 determines that the value of X is less than or equal to X_SIZE (S29: NO), then the CPU 101 returns to S23 and repeats the process described above.

On the other hand, if the CPU 101 determines that the value of X is greater than X_SIZE (S29: YES), then in S30 the CPU 101 sets X to zero and increments Y.

Next, the CPU 101 determines in S31 whether the value of Y is greater than Y_SIZE.

If the CPU 101 determines that the value of Y is less than or equal to Y_SIZE (S31: NO), then the CPU 101 returns to S23 and repeats the aforementioned processes.

On the other hand, if the CPU 101 determines that the value of Y is greater than Y_SIZE (S31: YES), then the CPU 101 ends the cube interpolation process.

When the above-described process of S13 is completed, the corrected image data sets P(X,Y)=(Rout, Gout, Bout) for all the X_SIZE×Y_SIZE number of pixels are converted to output image data sets (Cout, Mout, Yout, Kout) that are defined in the CMYK color space for the printer 200.

In this way, according to the present embodiment, the triangular pyramid interpolation is used to convert RGB color signals (Rin, Gin, Bin) in the RGB color space to RGB color signals (Rout, Gout, Bout) in the other RGB color space, and the cube interpolation is used to convert RGB color signals (Rout, Gout, Bout) in the RGB color space to the CMYK color signals (Cout, Mout, Yout, Kout) in the CMYK color space.

If the cube interpolation were used to convert RGB color signals (Rin, Gin, Bin) in the RGB color space to the RGB color signals (Rout, Gout, Bout) in the other RGB color space, there will arise problems in converting gray RGB color signals (Rin, Gin, Bin) that have the same values for all the red, green, and blue color components Rin, Gin, and Bin and therefore that represent gray. This is because cube interpolation for the gray color signals (Rin, Gin, Bin) is executed by using not only grid points that represent gray but also other grid points that do not represent gray.

Figure 12:
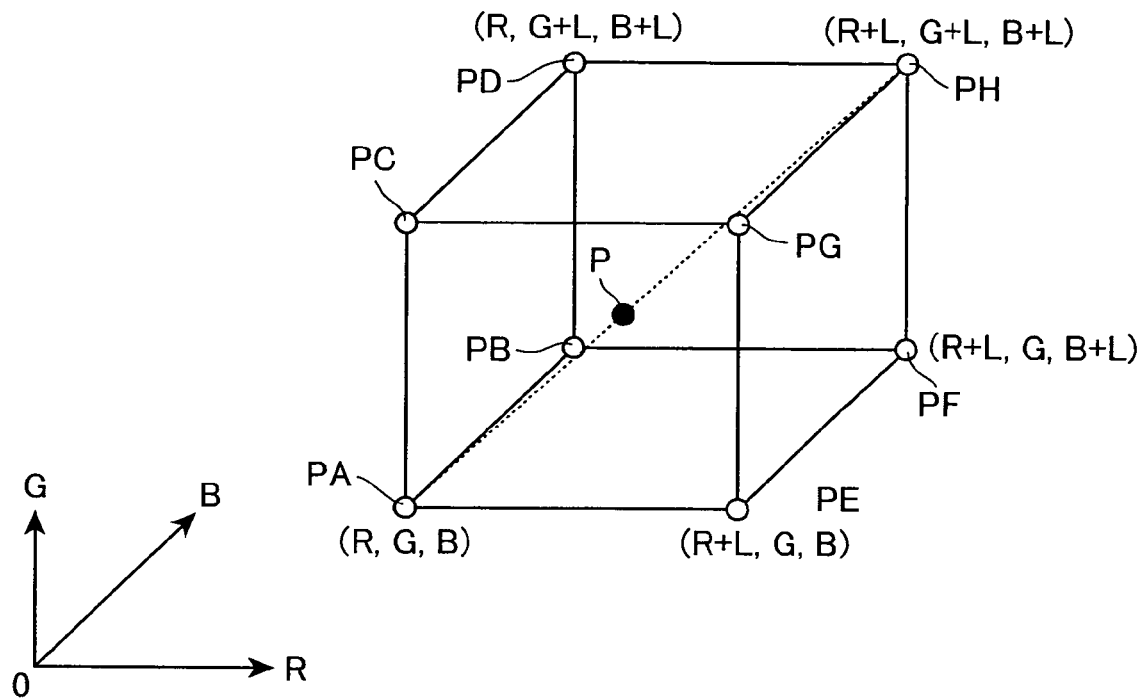
FIG. 12 is an explanatory diagram showing a gray reproducing problem.

It is now assumed that as shown in FIG. 12, a conversion point P(Rin, Gin, Bin) is located within a unit cube that is formed from the grid points PA, PB, PC, PD, PE, PF, PG, and PH. It is also assumed that the conversion point P(Rin, Gin, Bin) is located on a gray axis and that a line segment connecting grid points PA and PH is located on the gray axis. In other words, the values Rin, Gin, and Sin in the conversion point P(Rin, Gin, Bin) are equal to one another, and therefore the conversion point P(Rin, Gin, Bin) represents gray.

It is further assumed that the cube interpolation method were employed to convert the conversion point P(Rin, Gin, Bin) into a corrected image data set (Rout, Gout, Bout) by interpolating eight RGB parameter sets (R', G', B') that are stored in the RGB-RGB conversion table $T_{RGB-RGB}$ in FIG. 2(a) in correspondence with the eight grid points PA, PB, PC, PD, PE, PF, PG, and PH. It is noted that the RGB parameter set (R', G', 3') for each of the two grid points PA and PH has the color components R', G', and B' equal to one another and therefore represents gray. The RGB parameter set (R', G', B') for each of the remaining six grid points PB-PG has the color components R', G', and B' different from one another and therefore does not represent gray.

According to the cube interpolation method, not only RGB parameter sets (R', G', B') at the grid points PA and PH but also RGB parameter sets (R', G', B') at the other remaining Six grid points PB-PG will be used in the interpolation. Accordingly, the image data set (Rin, Gin, Bin) at the conversion point P will be converted possibly into a corrected image data set (Rout, Gout, Bout), whose values Rout, Gout, Bout are different from one another and therefore which deviates from gray.

Contrarily, according to the present embodiment, the triangular pyramid interpolation process is employed to convert the conversion point P(Rin, Gin, Bin) into a corrected image data set (Rout, Gout, Bout) by interpolating RGB parameters (R', G', B') for four grid points that has at least the grid points PA and PH and that defines a triangular pyramid including the conversion point P therein. Accordingly, if the conversion point P(Rin, Gin, Bin) exists on the gray axis and therefore represents gray, an interpolation process is executed using only the two grid points PA and PH that represent gray. It is possible to ensure that the corrected image data set (Rout, Gout, Bout) at the conversion point P will also be gray.

Similarly, if the triangular pyramid interpolation were used to convert RGB color signals (Rout, Gout, Bout) in the RGB color space to CMYK color signals (Cout, Mout, Yout, Kout) in the CMYK color space, a resultant image will possibly be formed with geometric patterns having angular contours (block noise).

In triangular pyramid interpolation, four grid points forming a triangular pyramid are used for conversion when the conversion point P (Rout, Gout, Bout) lies within the triangular pyramid. However, if the conversion point lies on one surface of the triangular pyramid, then conversion is performed using the three grid points that are located on the particular surface.

Figure 13:
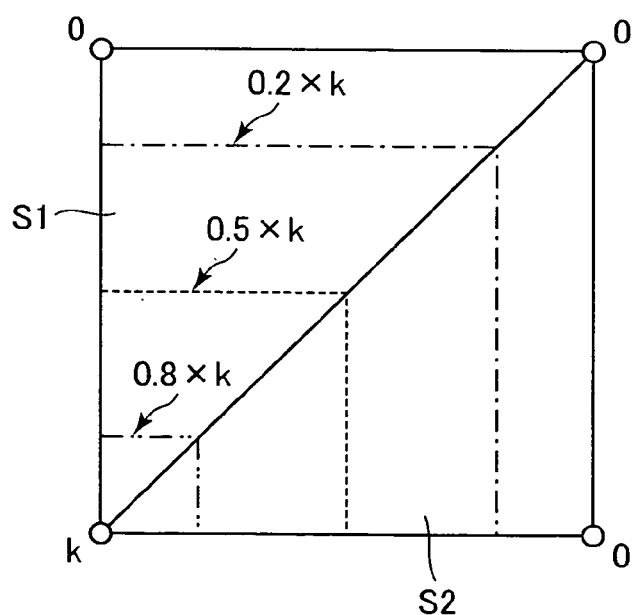
FIG. 13 is an explanatory diagram showing block noise.

It is now assumed that the conversion point lies on either one of two surfaces S1 and S2 of some triangular pyramid shown in FIG. 13. The triangular pyramid is defined by four grid points. The RGB-CMYK conversion table $T_{RGB-CMYK}$ has a CMYK parameter set (C, M, Y, K) in correspondence with each grid point as shown in FIG. 2(b).

It is also assumed that as shown in FIG. 13, the value of the K component in the CMYK parameter set (C, M, Y, K) for one grid point has a value k that is different from zero (0), while the K component in the CMYK parameter set (C, M, Y, K) for each of the other three grid points has a value of zero (0).

If the conversion point P is located on the surface S1 or S2, the K component in the CMYK color signal (Cout, Mout, Yout, Kout) for the conversion point P is calculated by interpolating the K component values k, 0, and 0 in the CMYK parameters for the three grid points that are located on the corresponding surface S1 or S2.

For those conversion points that will possibly be located on a dashed line in FIG. 13, the K components in the CMYK color signals (Cout, Mout, Yout, Kout) are determined as equal to 0.5×k through triangular pyramid interpolation. For other conversion points that will possibly be located on a single dot and dash line in FIG. 13, the K components in the CMYK color signals (Cout, Mout, Yout, Kout) are determined as equal to 0.2×k through triangular pyramid interpolation. For other conversion points that will possibly be located on a double-dot single-dash line in FIG. 13, the K components in the CMYK color signals (Cout, Mout, Yout, Kout) are determined as equal to 0.8×k through triangular pyramid interpolation. As a result, CMYK color signals (Cout, Mout, Yout, Kout) are obtained with their K components reproducing a gradation having angular contours within planes of a triangular pyramid, giving rise to geometric patterns (block noise).

The method used to reproduce gray in the CMYK color space is to use a mixture of the CMY colors when reproducing light gray and to add the K color for darker grays. For this reason, the phenomenon shown in FIG. 13, in which only one of the four grid points has a K component not equal to zero, tends to occur frequently, leading to the generation of geometric patterns in the CMYK color space.

Contrarily, according to the present embodiment, the cube interpolation is employed to convert RGB color signals (Rout, Gout, Bout) in the RGB color space to CMYK color signals (Cout, Mout, Yout, Kout) in the CMYK color space, thereby preventing occurrence of the block noise.

As described above, according to the present embodiment, the CPU 101 determines whether the CMYK conversion indication flag Fc has been set in the process of S11. If the flag Fc has been set, then in S13 the CPU 101 performs cube interpolation by selecting eight grid points forming a cube that includes the conversion point therein. On the other hand, if the flag Fc has not been set, then in S15 the CPU 101 performs triangular pyramid interpolation by selecting four grid points forming a triangular pyramid that includes the conversion point therein and includes one edge that extends in the same direction with the direction in which the gray axis extends.

Hence, when converting an image data set P(Rout,Gout, Bout) to an image data set (Cout, Mout, Yout, Kout), the CPU 101 performs cube interpolation by selecting eight grid points forming a cube. Accordingly, if the conversion point falls on a surface of the cube, the conversion point is surrounded by four grid points forming the particular surface. Interpolation is performed using the four grid points forming the surface. Block noise that will possibly occur when performing triangular pyramid interpolation using only three grid points of the surface is not generated.

Gray can be expressed by the K components in the CMYK color signals (Cout, Mout, Yout, Kout) in the CMYK color space. Therefore, by expressing gray with the K component, it is possible to prevent problems in reproducing gray due to changes in the ratios of a CMY mixture. As a result, the reproducibility of gray can be maintained and block noise is suppressed.

Further, in order to convert a set of image data P(Rin, Gin, Bin) to a corrected image data set (Rout, Gout, Bout), the CPU 101 performs triangular pyramid interpolation by selecting four grid points forming a triangular pyramid whose one edge extends in the same direction with the direction in which the gray axis extends and which includes the conversion point (Rin, Gin, Bin) therein. Accordingly, if the conversion point is positioned on the gray axis, the corrected image data set (Rout, Gout, Bout) is determined by interpolating the RGB parameters (R', G', B') for only those two grid points that are located on the gray axis. Therefore, it is ensured that the conversion point (Rin,Gin,Bin) expressing gray is converted to RGB color data (Rout, Gout, Bout) that represents gray.

The block noise is a problem only for K components that are highly visible. Therefore, block noise is not a problem during practical use in the RGB color space.

Further, during the process of S45 to select an interpolation triangular pyramid, the processing load for interpolation is small since only four grid points need be selected to form a triangular pyramid whose one edge extends in the direction the same as the direction in which the gray axis extends.

Thus, according to the present embodiment, the reproducibility of gray can be maintained and block noise can be suppressed when converting a set of image data in the RGB color space to a set of image data in another RGB color space and also when converting a set of image data in the color space represented by the combination of RGB components to a set of image data in the CMYK color space.

<First Modification>

In the above description, the triangular pyramid interpolation process is executed in S15. However, a slanted triangular prism interpolation may be executed in S15 instead of the triangular pyramid interpolation process. According to the slanted triangular prism interpolation process, as shown in FIG. 14, six grid points P21, P22, P23, P24, P25, and P26 are selected for the conversion point P(Rin, Gin, Bin) so that the six grid points form a slanted triangular prism T21 that includes the conversion point P therein.

This slanted triangular prism interpolation process will be described below in greater detail.

It is noted that the RGB-RGB conversion table $T_{RGB-RGB}$ of FIG. 2(a) stores therein RGB parameter sets (R21', B21', G'21), (R22', B22', G'22), (R23', B23', G'23), (R24', R24', G'24), (R25', B25', G'25), and (R26', B26', G'26) in correspondence with the six grid points P21, P22, P23, P24, P25, and P26, respectively.

A line segment connecting the grid points P26 and P23, another line segment connecting the grid points P25 and P22, and another line segment connecting the grid points P24 and P21 all extend in the same direction in which the gray axis extends. More specifically, if the line segment connecting the grid points P26 and P23 is located on the gray axis, the line segment connecting the grid points P25 and P22 and the line segment connecting the grid points P24 and P21 extend parallel with the gray axis. If the line segment connecting the grid points P26 and P23 is shifted from the gray axis but extends parallel with the gray axis, the line segment connecting the grid points P25 and P22 and the line segment connecting the grid points P24 and P21 extend also parallel with the gray axis.

In order to convert the image data set (Rin, Gin, Bin) at the conversion point P into a corrected image data set (Rout, Gout, Bout), a straight line Lp is drawn through the conversion point P in parallel with the line segment connecting the grid points P26 and P23. The straight line Lp intersects a plane that is formed by the grid points P24, P25, and P26 at a point Pm(Rm, Gm, Bm), and intersects another plane formed by the grid points P21, P22, and P23 at another point Pn(Rn, Gn, Bn). A distance between the points Pn and Pm along the line Lp has a length $D_{Pn-P}$, a distance between the point Pm and the conversion point P along the line Lp has a length $D_{Pm-P}$, and a distance between the point Pn and the conversion point P along the line Lp has a length $D_{Pn-P}$.

It is noted that the area of a triangle formed by grid is points P21, P22, and P23 has an amount S[P21, P22, P23], and that the area of a triangle formed by grid points P24, P25, and P26 has an amount S[P24, P25, P26]. The area of a triangle formed by grid points P22 and P23 and the point Pn has an amount S[P22, P23, Pn]. The area of a triangle formed by grid points P21 and P23 and the point Pn has an amount S[P21, P23, Pn]. The area of a triangle formed by grid points P21 and P22 and the point Pn has an amount S[P21, P22, Pn]. The area of a triangle formed by grid points P25 and P26 and the point Pm has an amount S[P25, P26, Pm]. The area of a triangle formed by grid points P24 and P26 and the point Pm has an amount S[P24, P26, Pm]. The area of a triangle formed by grid points P24 and P25 and the point Pm has an amount S[P24, P25, Pm]. The amount S[P21, P22, P23] is equal to the amount S[P24, P25, P26], the amount S[P22, P23, Pn] is equal to the amount S[P25, P26, Pm], the amount S[P21, P23, Pn] is equal to the amount S[P24, P26, Pm], and the amount S[P21, P22, Pn] is equal to the amount S[P24, P25, Pm].

Weighting factors W21, W22, W23, W24, W25, and W26 for the grid points P21, P22, P23, P24, P25, and P26 are calculated as expressed by the following equations (21)-(26):

$$W21 = \{D_{Pm-P}/D_{Pn-Pm}\} \times \{S[P22,P23,Pn]/S[P21,P22,P23]\} \quad (21)$$

$$W22=\{D_{Pm\_P}/D_{Pn\_Pm}\}\times\{S[P21,P23,Pn]/S[P21,P22,P23]\} \quad (22)$$

$$W23=\{D_{Pm\_P}/D_{Pn\_Pm}\}\times\{S[P22,P22,Pn]/S[P21,P22,P23]\} \quad (23)$$

$$W24=\{D_{Pn\_P}/D_{Pn\_Pm}\}\times\{S[P25,P26,Pn]/S[P24,P25,P26]\} \quad (24)$$

$$W25=\{D_{Pn\_P}/D_{Pn\_Pm}\}\times\{S[P24,P26,Pn]/S[P24,P25,P26]\} \quad (25)$$

$$W26=\{D_{Pn\_P}/D_{Pn\_Pm}\}\times\{S[P24,P25,Pn]/S[P24,P25,P26]\} \quad (26)$$

A corrected image data set (Rout, Gout, Bout) for the conversion point P(Rin, Gin, Bin) is therefore calculated in the following formulas (27)-(29):

$$Rout=W21\times R21'+W22\times R22'+W23\times R23'+W24\times R24'+W25\times R25'+W26\times R26' \quad (27)$$

$$Gout=W21\times G21'+W22\times G22'+W23\times G23'+W24\times G24'+W25\times G25'+W26\times G26' \quad (28)$$

$$Bout=W21\times B21'+W22\times B22'+W23\times B23'+W24\times B24'+W25\times B25'+W26\times B26' \quad (29)$$

If the line segment connecting the grid points P26 and P23 is located on the gray axis and if the conversion point P(Rin, Gin, Bin) is located on the gray axis, the parameter set (Rout, Gout, Bout) for the point P is calculated based only on the parameters sets (R23', G23', B23') and (R26', G26', B26') for the grid points P23 and P26.

The CPU 101 performs interpolation by selecting six grid points forming a slanted triangular prism whose one edge extends in the same direction with the direction in which the gray axis extends and which includes the conversion point P therein. Accordingly, a conversion point positioned on the gray axis can be interpolated using only two grid points that are located on the gray axis. Therefore, image data expressing gray can be converted to image data that expresses gray.

The processing load for interpolation is still small because it is possible to select only six grid points forming the slanted triangular prism.

Details of the slanted triangular prism interpolation process are described in U.S. Pat. Nos. 5,504,821 and 5,311,332, the disclosure of which is herein incorporated by reference.

<Second Modification>

In the above description, each of the color conversion processes of S03 and S06 is executed as shown in FIG. 4. That is, in the color conversion process, the CPU 101 switches between the cube interpolation process and the triangular prism interpolation process by determining in S11 whether the CMYK conversion indication flag Fc has been set. However, each of the color conversion process of S03 and S06 may be executed as shown in FIG. 15.

Next, the color conversion process according to this modification will be described with reference to FIG. 15.

Figure 15:
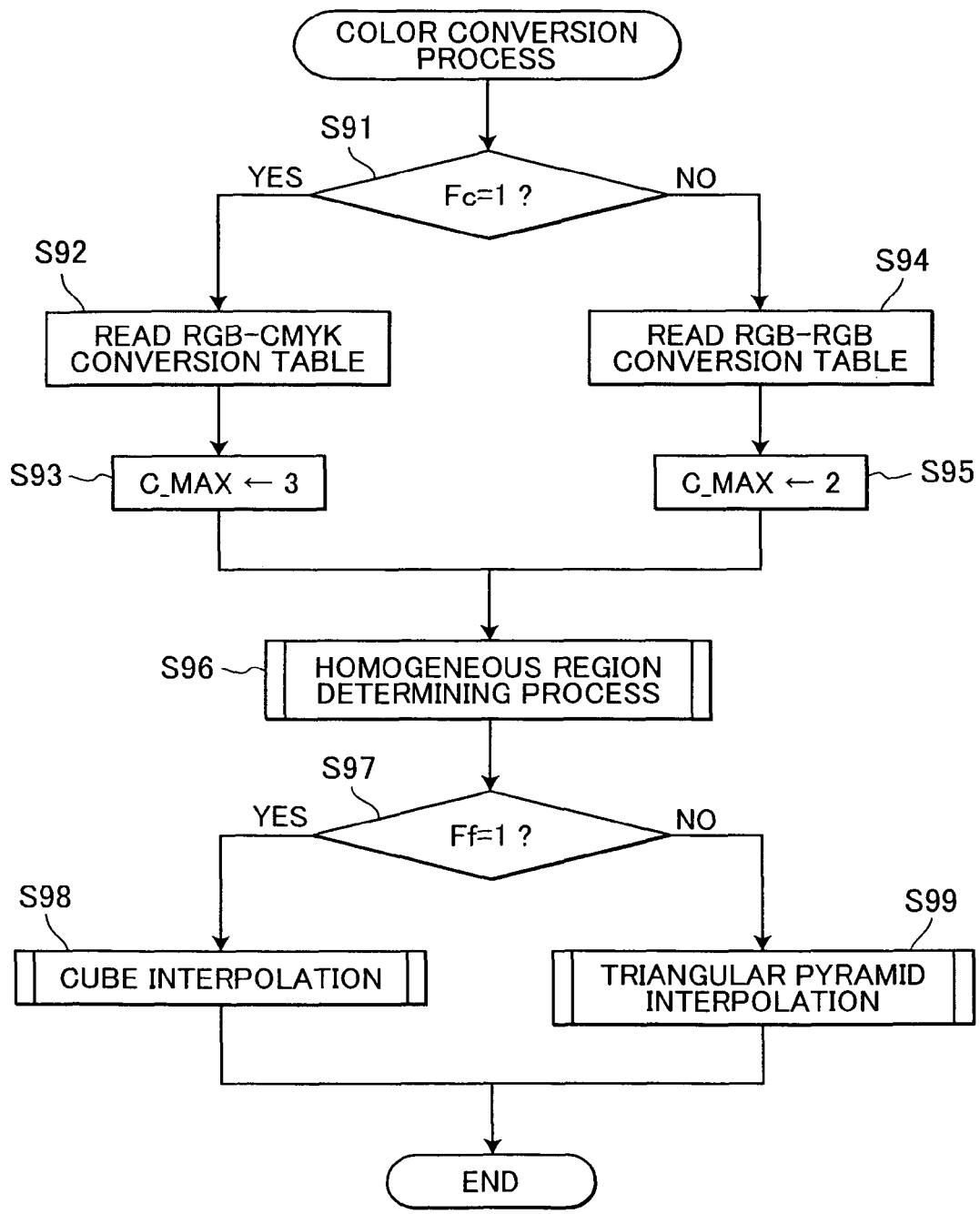
FIG. 15 is a flowchart showing steps in the color conversion process in FIG. 3 according to a second modification of the first embodiment.

FIG. 15 is a flowchart showing steps in the color conversion process.

At the beginning of the process, the CPU 101 determines in S91 whether the CMYK conversion indication flag Fc has been set.

If the flag Fc has been set (S91: YES), then in S92 the CPU 101 reads data of the RGB-CMYK conversion table $T_{RGB-CMYK}$ from the hard disc drive 102 and stores this data in the RAM 104.

In S93 the CPU 101 sets a maximum color indication number C_MAX to three (3). It is noted that the maximum color indication number C_MAX is defined as a result obtained by subtracting one (1) from the total number of color components that are defined in a color space, to which the color conversion is to be attained. In this case, when the CMYK conversion indication flag Fc has already been set (yes in S91), it is known that color conversion is to be attained to the CMYK color space. Accordingly, the maximum color indication number C_MAX is set to three (3) by subtracting one (1) from the total number (4) of color components defined in the CMYK color space.

On the other hand, if the CPU 101 determines that the flag Fc has not been set (S91: NO), then in S94 the CPU 101 reads data of the RGB-RGB conversion table $T_{RGB-RGB}$ from the hard disc drive 102 and stores this data in the RAM 104.

In S95 the CPU 101 sets C_MAX to two (2). Because the flag Fc has not been set (S91: NO), it is known that color conversion is to be attained to the RGB color space. Accordingly, the maximum color indication number C_MAX is set to two (2) by subtracting one (1) from the total number (3) of color components defined in the RGB color space.

Figure 16:
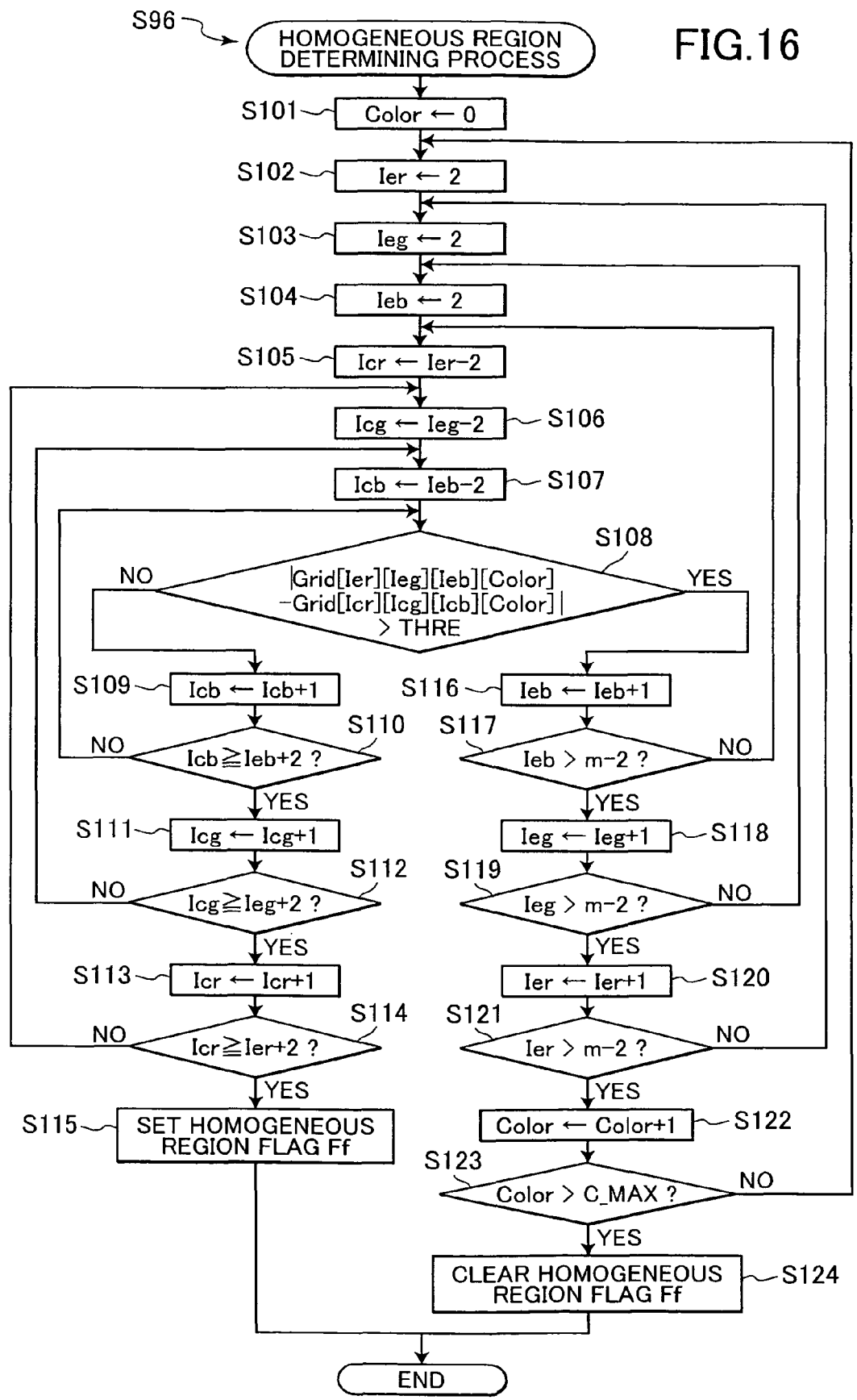
FIG. 16 is a flowchart showing steps in a homogenous region determining process in FIG. 15.

In S96 the CPU 101 performs a homogeneous region determining process of FIG. 16. As will be described later, during the homogeneous region determining process of S96, the CPU 101 sets or clears a homogeneous region determining flag Ff.

In S97 the CPU 101 determines whether the homogeneous region determining flag Ff has been set during the homogeneous region determining process of S96.

If the CPU 101 determines that the flag Ff has not been set (S97: NO), then in S99 the CPU 101 executes the triangular pyramid interpolation process by using the conversion table $T_{RGB-RGB}$ has been read out in S92 or S94.

It is noted that if the conversion table $T_{RGB-RGB}$ has been read out in S94, the triangular pyramid interpolation process of S99 is executed in the same manner as in the process of FIG. 5 and FIG. 6. On the other hand, if the conversion table $T_{RGB-CMYK}$ has been read out in S92, the triangular pyramid interpolation process is executed in the same manner as in the process of FIG. 5 and FIG. 6 except that the conversion table $T_{RGB-CMYK}$ is used in place of the conversion table $T_{RGB-RGB}$. That is, the process of S48 (FIG. 5) is modified in a manner described below:

The CPU 101 locates the conversion point P(Rout, Gout, Bout) in the RGB color space for the printer 200 in the same manner as shown in FIG. 7, selects a triangular pyramid that includes therein the conversion point P(Rout, Gout, Bout) as shown in FIG. 9, calculates the weighting factors W11-W14 by the formulas (2)-(5), and reads out the four-sets of CMYK parameters (C11, M11, Y11, K11), (C12, M12, Y12, K12), (C13, M13, Y13, K13), and (C14, M14, Y14, K14) that are stored in the conversion table $T_{RGB-CMYK}$ in correspondence with the grid points P11, P12, P13, and P14 (FIG. 9). The CPU 101 calculates an output image data set (Cout, Mout, Yout, Kout) for the conversion point P(Rout, Gout, Bout) according to the following equations:

$$Cout=W11\times C11+W12\times C12+W13\times C13+W14\times C14$$

$$Mout=W11\times M11+W12\times M12+W13\times M13+W14\times M14$$

$$Yout=W11\times Y11+W12\times Y12+W13\times Y13+W14\times Y14$$

$$Kout=W11\times K11+W12\times K12+W13\times K13+W14\times K14$$

After completing the process of S99, the CPU 101 ends the color conversion process.

On the other hand, if the flag Ff has been set (S97: YES), then in S98 the CPU 101 performs the cube interpolation process by using the conversion table $T_{RGB\text{-}CMYK}$ or $T_{RGB\text{-}RGB}$ that has been read out in S92 or S94.

It is noted that if the conversion table $T_{RGB\text{-}CMYK}$ has been read out in S92, the cube interpolation process of S98 is executed in the same manner as in the process of FIG. 10. On the other hand, if the conversion table $T_{RGB\text{-}RGB}$ has been read out in S94, the cube interpolation process is executed in the same manner as in the process of FIG. 10 except that the conversion table $T_{RGB\text{-}RGB}$ is used in place of the conversion table $T_{RGB\text{-}CMYK}$. That is, the process of S27 (FIG. 10) is modified in a manner described below:

The CPU 101 locates the conversion point P(Rin, Gin, Bin) in the RGB color space for the input device in the same manner as shown in FIG. 11, selects a unit interpolation cube that includes therein the conversion point P(Rin, Gin, Bin) as shown in FIG. 11, calculates the weighting factors W1-W8 by the formulas (9)-(16), and reads out the eight sets of RGB parameters (R1', G1', B5'), (R2', G2', B2'), (R3', G3', B3'), (R4', G4', B4'), (R5', G5', B5'), (R6', G6', B6'), (R7', G7', B7'), and (R8', G8', B8') that are stored in the conversion table $T_{RGB\text{-}RGB}$ in correspondence with the grid points P1, P2, P3, P4, P5, P6, P7, and P8 (FIG. 11). The CPU 101 calculates a corrected image data set (Rout, Gout, Bout) for the conversion point P(Rin, Gin, Bin) according to the following equations:

$$Rout = W1 \times R1' + W2 \times R2' + W3 \times R3' + W4 \times R4' + W5 \times R5' + W6 \times R6' + W7 \times R7' + W8 \times R8'$$

$$Gout = W1 \times G1' + W2 \times G2' + W3 \times G3' + W4 \times G4' + W5 \times G5' + W6 \times G6' + W7 \times G7' + W8 \times G8'$$

$$Bout = W1 \times B1' + W2 \times B2' + W3 \times B3' + W4 \times B4' + W5 \times B5' + W6 \times B6' + W7 \times B7' + W8 \times B8'$$

After completing the process in S98 the CPU 101 ends the color conversion process.

Figure 17:
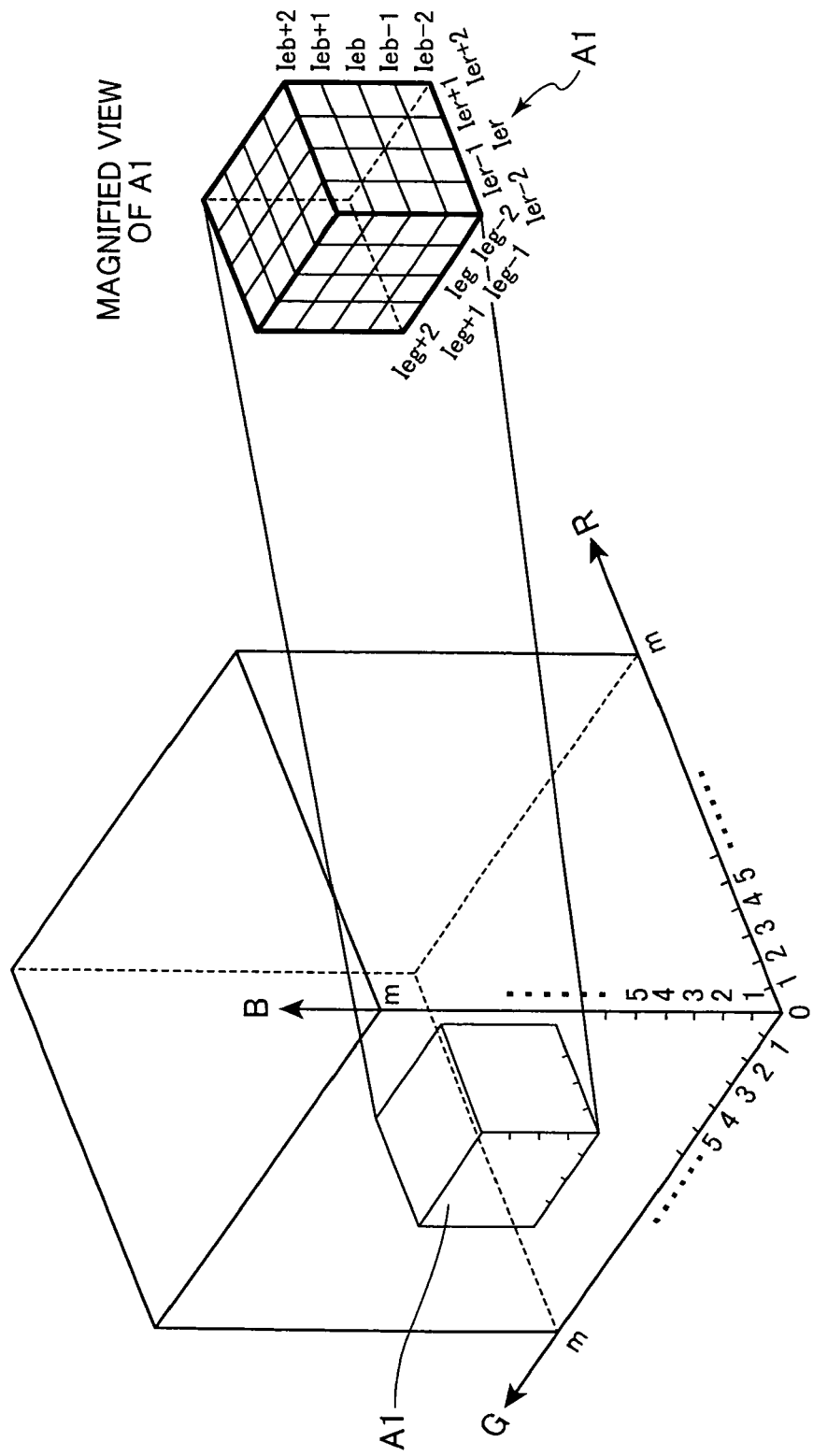
FIG. 17 is an explanatory diagram showing the homogeneous region determining process in FIG. 16.

Next, the homogeneous region determining process performed in S96 of FIG. 15 will be described with reference to FIG. 16 and FIG. 17.

FIG. 16 is a flowchart showing steps in the homogeneous region determining process. FIG. 17 illustrates how to execute the homogeneous region determining process.

It is noted that among all the grid points identified by all the identification number combinations (Ir, Ig, Ib) (wherein $0 \leq Ir \leq m$, $0 \leq Ig \leq m$, and $0 \leq Ib \leq m$), examination grid points (Ier, Ieg, Ieb) (wherein $2 \leq Ier \leq m-2$, $2 \leq Ieg \leq m-2$, and $2 \leq Ier \leq m-2$) are set. With respect to each examination grid point (Ier, Ieg, Ieb), a plurality of (124, in this example) comparative grid points (Icr, Icg, Icb) (wherein $Ier-2 \leq Icr \leq Ier+2$, $Ieg-2 \leq Icg \leq Ieg+2$, and $Ieb-2 \leq Icb \leq Ieb+2$) are set to surround the subject examination grid point (Ier, Ieg, Ieb). As shown in FIG. 17, the examination grid point (Ier, Ieg, Ieb) and all the 124 comparative grid points (Icr, Icg, Icb) are arranged in a cube-shape A1, with the examination grid point (Ier, Ieg, Ieb) being located at the center of the cube A1.

The conversion table $T_{RGB\text{-}CMYK}$ stores therein a parameter value set (C, M, Y, K) in correspondence with each examination grid point (Ier, Ieg, Ieb). The parameter value C for each examination grid point (Ier, Ieg, Ieb) is indicated by "Grid[Ier][Ieg][Ieb][0]", the parameter value M for each examination grid point (Ier, Ieg, Ieb) is indicated by "Grid[Ier][Ieg][Ieb][1]", the parameter value Y for each examination grid point (Ier, Ieg, Ieb) is indicated by "Grid[Ier][Ieg][Ieb][2]", and the parameter value K for each examination grid point (Ier, Ieg, Ieb) is indicated by "Grid[Ier][Ieg][Ieb][3]".

Similarly, the conversion table $T_{RGB\text{-}CMYK}$ stores therein a parameter value set (C, M, Y, K) in correspondence with each comparative grid point (Icr, Icg, Icb). The parameter value C for comparative grid point (Icr, Icg, Icb) is indicated by "Grid[Icr][Icg][Icb][0]", the parameter value M for comparative grid point (Icr, Icg, Icb) is indicated by "Grid[Icr][Icg][Icb][1]", the parameter value Y for comparative grid point (Icr, Icg, Icb) is indicated by "Grid[Icr][Icg][Icb][2]", and the parameter value K for comparative grid point (Icr, Icg, Icb) is indicated by "Grid[Icr][Icg][Icb][3]".

It is now assumed that the conversion table $T_{RGB\text{-}CMYK}$ has been read in S92. In such a case, during the homogeneous region determining process of S96, the CPU 101 tries calculating, for each examination grid point (Ier, Ieg, Ieb): differences between the parameter C at the subject examination grid point (Ier, Ieg, Ieb) and the parameters C at the plurality of (124, in this example) comparative grid points (Icr, Icg, Icb) for the subject examination grid point (Ier, Ieg, Ieb); differences between the parameter M at the subject examination grid point (Ier, Ieg, Ieb) and the parameters M at the plurality of (124, in this example) comparative grid points (Icr, Icg, Icb) for the subject examination grid point (Ier, Ieg, Ieb); differences between the parameter Y at the subject examination grid point (Ier, Ieg, Ieb) and the parameters Y at the plurality of (124, in this example) comparative grid points (Icr, Icg, Icb) for the subject examination grid point (Ier, Ieg, Ieb); and differences between the parameter K at the subject examination grid point (Ier, Ieg, Ieb) and the parameters K at the plurality of (124, in this example) comparative grid points (Icr, Icg, Icb) for the subject examination grid point (Ier, Ieg, Ieb). Thus, the CPU 101 tries calculating 496 (=124×4) differences for each examination grid point (Ier, Ieg, Ieb). The CPU 101 compares the calculated differences with a predetermined threshold value "THRE". If all the 496 differences calculated for some examination grid point (Ier, Ieg, Ieb) are smaller than or equal to the threshold value "THRE", the CPU 101 stops calculating and determines that the CMYK color space defined by the RGB-CMYK conversion table $T_{RGB\text{-}CMYK}$ has a homogeneous region. If at least one of the 496 differences that are calculated for each examination grid point (Ier, Ieg, Ieb) is greater than the threshold value "THRE", the CPU 101 determines that the CMYK color space, defined by the RGB-CMYK conversion table $T_{RGB\text{-}CMYK}$, has no homogeneous region.

The conversion table $T_{RGB\text{-}RGB}$ stores therein a parameter value set (R', G', B') in correspondence with each examination grid point (Ier, Ieg, Ieb). The parameter value R' for each examination grid point (Ier, Ieg, Ieb) is indicated by "Grid[Ier][Ieg][Ieb][0]", the parameter value G' for each examination grid point (Ier, Ieg, Ieb) is indicated by "Grid[Ier][Ieg][Ieb][1]", and the parameter value B' for each examination grid point (Ier, Ieg, Ieb) is indicated by "Grid[Ier][Ieg][Ieb][2]".

Similarly, the conversion table $T_{RGB\text{-}RGB}$ stores therein a parameter value set (R', G', B') in correspondence with each comparative grid point (Icr, Icg, Icb). The parameter value R' for comparative grid point (Icr, Icg, Icb) is indicated by "Grid[Icr][Icg][Icb][0]", the parameter value G' for comparative grid point (Icr, Icg, Icb) is indicated by "Grid[Icr][Icg][Icb][1]", and the parameter value B' for comparative grid point (Icr, Icg, Icb) is indicated by "Grid[Icr][Icg][Icb][2]".

It is now assumed that the conversion table $T_{RGB\text{-}RGB}$ has been read in S94. In such a case, during the homogeneous region determining process of S96, the CPU 101 tries calculating, for each examination grid point (Ier, Ieg, Ieb); differences between the parameter R' at the subject examination grid point (Ier, Ieg, Ieb) and the parameters R' at the plurality of (124, in this example) comparative grid points (Icr, Icg, Icb) for the subject examination grid point (Ier, Ieg, Ieb); differences between the parameter G' at the subject examination grid point (Ier, Ieg, Ieb) and the parameters G' at the plurality of (124, in this example) comparative grid points (Icr, Icg, Icb) for the subject examination grid point (Ier, Ieg, Ieb); and differences between the parameter B' at the subject examination grid point (Ier, Ieg, Ieb) and the parameters B' at the plurality of (124, in this example) comparative grid points (Icr, Icg, Icb) for the subject examination grid point (Ier, Ieg, Ieb). Thus, the CPU 101 tries calculating 372 (=124×3) differences for each examination grid point (Ier, Ieg, Ieb). The CPU 101 compares the calculated differences with a predetermined threshold value "THRE". If all the 372 differences calculated for some examination grid point (Ier, Ieg, Ieb) are smaller than or equal to the threshold value "THRE", the CPU 101 stops calculating and determines that the RGB color space for the printer 200 defined by the RGB-RGB conversion table $T_{RGB\text{-}RGB}$ has a homogeneous region. If at least one of the 372 differences that are calculated for each examination grid point (Ier, Ieg, Ieb) is greater than the threshold value "THRE", the CPU 101 determines that the RGB color space for the printer 200 defined by the RGB-RGB conversion table $T_{RGB\text{-}RGB}$ has no homogeneous region.

Next, the homogeneous region determining process will be described with reference to FIG. 16.

At the beginning of the homogeneous region determining process, the CPU 101 sets a color indication number "Color" to zero (0) in S101. It is noted that when the conversion table $T_{RGB\text{-}CMYK}$ has been read in S92, the color indication numbers "Color" of values 0, 1, 2, and 3 indicate cyan (C), magenta (M), yellow (Y), and black (K), respectively. When the conversion table $T_{RGB\text{-}RGB}$ has been read in S94, the color indication numbers "Color" of values 0, 1, and 2 indicate red (R), green (G), and blue (B), respectively.

In S102 the CPU 101 sets the R-axis coordinate Ier for the examination grid point to 2.

In S103 the CPU 101 sets the G-axis coordinate Ieg of the examination grid point to 2.

In S104 the CPU 101 sets the B-axis coordinate Ieb of the examination grid point to 2.

In S105 the CPU 101 sets the R-axis coordinate Icr of the comparative grid point to the value of (Ier−2).

In S106 the CPU 101 sets the G-axis coordinate Icg of the comparative grid point to the value of (Ieg−2).

In S107 the CPU 101 sets the B-axis coordinate Icb of the comparative grid point to the value of (Ieb−2).

In S108 the CPU 101 calculates the difference between the present color parameter "Grid[Ier][Ieg][Ieb][Color]" for the present examination grid point (Ier, Ieg, Ieb) and the present color parameter "Grid[Icr][Icg][Icb][Color]" for the present comparative grid point (Icr,Icg,Icb). The CPU 101 then determines whether this difference "|Grid[Ier][Ieg][Ieb][Color]−Grid[Icr][Icg][Icb][Color]|" is greater than the threshold value "THRE".

If the CPU 101 determines that the difference is smaller than or equal to the threshold value "THRE" (S108: NO), then in S109 the CPU 101 increments the value "Icb" by one (1).

In S110 the CPU 101 determines whether the value "Icb" becomes greater than or equal to the value of (Ieb+2).

If the CPU 101 determines that the value "Icb" is smaller than the value (Ieb+2) (S110: NO), then CPU 101 repeats the above processes from S108.

On the other hand, if the CPU 101 determines that the value "Icb" reaches the value (Ieb+2) (S110: YES), then in S111 the CPU 101 increments the value "Icg" by one (1).

In S112 the CPU 101 determines whether the value "Icg" becomes greater than or equal to the value (Ieg+2).

If the value "Icg" is smaller than the value (Ieg+2) (S112: NO), then the CPU 101 repeats the processes from S107.

On the other hand, if the value "Icg" reaches the value (Ieg+2) (S112: YES), then in S113 the CPU 101 increments the value "Icr" by one (1).

In S114 the CPU 101 determines whether the value "Icr" is greater than or equal to the value (Ier+2).

If the CPU 101 determines that the value "Icr" is smaller than the value (Ier+2) (S114: NO), then the CPU 101 repeats the processes from S106.

On the other hand, if the value "Icr" reaches the value (Ier+2) (S114: YES), then in S115 the CPU 101 sets the homogeneous region flag Ff, provided in the RAM 104, to one (1) and ends the homogeneous region determining process of S96.

On the other hand, if in S108 the CPU 101 determines that the difference is greater than the threshold value "THRE" (S108: YES), then in S116 the CPU 101 increments the value "Ieb" by one (1).

In S117 the CPU 101 determines whether the value "Ieb" becomes greater than the value "m−2".

If the CPU 101 determines that the value of "Ieb" is smaller than or equal to the value (m−2) (S117: NO), then the CPU 101 repeats the processes from S105.

On the other hand, if the value "Ieb" becomes greater than the value (m−2) (S117: YES), then in S118 the CPU 101 increments the value "Ieg" by one (1).

In S119 the CPU 101 determines whether the value "Ieg" becomes greater than the value (m−2).

If the CPU 101 determines that the value "Ieg" is smaller than or equal to the value (m−2) (S119: NO), then the CPU 101 repeats the processes from S104.

On the other hand, if the value "Ieg" becomes greater than the value (m−2) (S119: YES), then in S120 the CPU 101 increments the value "Ier" by one (1).

In S121 the CPU 101 determines whether the value "Ier" becomes greater than the value (m−2).

If the CPU 101 determines that the value "Ier" is smaller than or equal to the value (m−2) (S121: NO), then CPU 101 repeats the processes from S103.

On the other hand, if the CPU 101 determines that the value "Ier" becomes greater than the value (m−2) (S121: YES), then in S122 the CPU 101 increments the value "Color" by one (1).

In S123 the CPU 101 determines whether the value "Color" is greater than the maximum color indication number C_MAX.

As described above, C_MAX has been set to 3 in S93 when converting from RGB to CMYK and to 2 in S95 when converting from RGB to RGB.

If the CPU 101 determines that the value "Color" is smaller than or equal to C_MAX (S123: NO), then the CPU 101 repeats the processes from S102.

On the other hand, if the value "Color" becomes greater than C_MAX (S123: YES), the CPU 101 clears the homogeneous region flag Ff to zero (0) and ends the homogeneous region determining process.

Hence, the CPU 101 calculates the differences in the four parameters (C,M,Y,K) of the CMYK color space or the differences in the three parameters (R',G',B') of the R'G'B' color space between an arbitrary examination grid point (Ier, Ieg, Ieb) and its surrounding 124 comparative grid points (Icr, Icg, Icb). If the CPU 101 finds at least one examination grid point (Ier,Ieg,Ieb) for which the differences with its all the comparative grid points (Icr, Icg, Icb) are less than or equal to the threshold value "THRE", the CPU 101 sets the homogeneous region flag Ff and ends the homogeneous region determining process.

However, if there is no examination grid point (Ier,Ieg,Ieb) for which the differences with its 124 comparative grid points (Icr, Icg, Icb) are all less than or equal to the threshold value "THRE", from among all the examination grid points (Ier, Ieg,Ieb), wherein $2 \leq \text{Ier} \leq m-2$, $2 \leq \text{Ieg} \leq m-2$, and $2 \leq \text{Ieb} \leq m-2$, then the CPU 101 clears the homogeneous region flag Ff and ends the homogeneous region determining process.

According to the present modification, the CPU 101 determines in S97 of FIG. 15 whether the homogeneous region flag Ff has been set.

If the flag Ff has been set, then in S98 of FIG. 15, the CPU 101 performs the cube interpolation. More specifically, if the RGB-CMYK conversion table $T_{RGB\text{-}CMYK}$ has been read out in S92, the CPU 101 performs the cube interpolation by selecting eight grid points forming a cube that includes the conversion point (Rout, Gout, Bout) therein and by determining the value (Cout, Mout, Yout, Kout) by interpolating the CMYK parameter values (C, M, Y, K) for the eight grid points. If the RGB-RGB conversion table $T_{RGB\text{-}RGB}$ has been read out in S94, the CPU 101 performs the cube interpolation by selecting eight grid points forming a cube that includes the conversion point (Rin, Gin, Bin) therein and by determining the value (Rout, Gout, Bout) by interpolating the RGB parameter values (R', G', B') for the eight grid points.

On the other hand, if the flag Ff has not been set, then in S99 of FIG. 15 the CPU 101 performs the triangular pyramid interpolation. More specifically, if the RGB-CMYK conversion table $T_{RGB\text{-}CMYK}$ a has been read out in S92, the CPU 101 performs the triangular pyramid interpolation by selecting four grid points forming a triangular pyramid that includes the conversion point (Rout, Gout, Bout) therein and whose edge extends in the same direction with the direction in which the gray axis extends and by determining the value (Cout, Mout, Yout, Kout) by interpolating the CMYK parameter values (C, M, Y, K) for the four grid points. If the RGB-RGB conversion table $T_{RGB\text{-}RGB}$ has been read out in S94, the CPU 101 performs the triangular pyramid interpolation by selecting four grid points forming a triangular pyramid that includes the conversion point (Rin, Gin, Bin) therein and whose edge extends in the same direction with the direction in which the gray axis extends and by determining the value (Rout, Gout, Bout) by interpolating the RGB parameter values (R', G', B') for the four grid points.

Hence, when a grid point exists in which the differences in color conversion values with the 124 grid points therearound are all less than or equal to the threshold value THRE in a color conversion table to be used, the CPU 101 performs interpolation by selecting eight grid points forming a cube. In this type of color conversion table, it is highly likely that a uniform region of color conversion values exists in the color coordinate space and that a region in which the color conversion values change abruptly exists outside of the uniform region. A surface of a unit cube will possibly have such four grid points, three of which are of substantially the same color conversion value and the remaining one of which has a color conversion value considerably different from the other three. If one conversion point is surrounded by the four grid points, however, since interpolation is performed using the four grid points, block noise that will possibly occur when performing interpolation using only three grid points of the surface is not generated.

Further, when there exists no grid point in which the differences in color conversion values with other grid points therearound are all less than or equal to the threshold value THRE in the color conversion table, the CPU 101 performs interpolation by selecting four grid points forming a triangular pyramid whose edge extends in the same direction in which the gray axis extends. In this type of color conversion table, there is little possibility that such a uniform region of color conversion values exists in the color coordinate space wherein the color conversion values for three of the four grid points forming a surface of a unit cube are substantially equal while the value of the remaining grid point is considerably different from the other three. Accordingly, when the conversion point is positioned on a surface of a unit cube, even when performing interpolation using only three grid points on the particular surface, there is little possibility that block noise will be generated.

Further, since interpolation is performed by selecting four grid points that forms a triangular pyramid whose edge extends in the same direction with the direction in which the gray axis extends, a conversion point positioned on the gray axis can be interpolated using only grid points that are located on the gray axis. Accordingly, a conversion point (R,G,B) expressing gray can be converted to a color signal that expresses gray. In this way, the reproducibility of gray can be ensured when using a color conversion table in which no homogeneous region exists.

Hence, according to this modification, the frequency in which block noise is generated can be reduced regardless of whether a homogeneous region exists in the color conversion table. Gray reproducibility can be enhanced when using the color conversion table in which no homogeneous region exists.

It is noted that the CPU 101 may thin out some grid points from the color conversion table before executing interpolation in order to simplify calculations. However, whether or not a homogeneous region exists varies according to how grid points are thinned out. Accordingly, it is necessary to perform the homogeneous region determining process of S96 prior to performing thinning.

However, the CPU 101 may not thin out grid points from the color conversion table, but may perform interpolation by using data of all the grid points in the color conversion table. In such a case, data indicating whether or not a uniform region exists in the color space represented by the color conversion table can be stored in the hard disk drive 102 together with the color conversion table. The judgment of S96 is executed by simply referring to the data indicative of whether or not a homogeneous region exists in the color space represented by the color conversion table read in S92 or S94.

In the above description, the triangular pyramid interpolation process is performed in S99 of FIG. 15. However, the slanted triangular prism interpolation, which is described with reference to FIG. 14, may be performed instead of the triangular pyramid interpolation process.

More specifically, if the CPU 101 determines that the flag Ff has not been set (S97: NO), then in S99 the CPU 101 executes the slanted triangular prism interpolation process by using the conversion table $T_{RGB\text{-}CMYK}$ or $T_{RGB\text{-}RGB}$ that has been read out in S92 or S94.

It is noted that if the conversion table $T_{RGB\text{-}RGB}$ has been read out in S94, the slanted triangular prism interpolation process of S99 is executed in the same manner as described with reference to FIG. 14. On the other hand, if the conversion table $T_{RGB\text{-}CMYK}$ has been read out in S92, the slanted triangular prism interpolation process is executed in the same manner as described with reference to FIG. 14 except that the conversion table $T_{RGB\text{-}CMYK}$ is used in place of the conversion table $T_{RGB\text{-}RGB}$. That is, during the slanted triangular prism interpolation process of S99, the CPU 101 locates the conversion point P(Rout, Gout, Bout) in the RGB color space in the same manner as shown in FIG. 14, selects a slanted triangular prism that includes therein the conversion point F(Rout, Gout, Bout) as shown in FIG. 14, calculates the weighting factors W21-W26 by the formulas (21)-(26), and reads out the six sets of CMYK parameters (C21, M21, Y21, K21), (C22, M22, Y22, K22), (C23, M23, Y23, K23), (C24, M24, Y24, K24), (C25, M25, Y25, K25), and (C26, M26, Y26, K26), which are stored in the conversion table $T_{RGB\text{-}CMYK}$ in correspondence with the grid points P21, P22, P23, P24, P25, and P26 (FIG. 14). The CPU 101 calculates an output image data set (Cout, Mout, Yout, Kout) for the conversion point P(Rout, Gout, Bout) according to the following equations:

$$Cout=W21{\times}C21+W22{\times}C22+W23{\times}C23+W24{\times}C24+W25{\times}C25+W26{\times}C26$$

$$Mout=W21{\times}M21+W22{\times}M22+W23{\times}M23+W24{\times}M24+W25{\times}M25+W26{\times}M26$$

$$Yout=W21{\times}Y21+W22{\times}Y22+W23{\times}Y23+W24{\times}Y24+W25{\times}Y25+W26{\times}Y26$$

$$Kout=W21{\times}K21+W22{\times}K22+W23{\times}K23+W24{\times}K24+W25{\times}K25+W26{\times}K26$$

Second Embodiment

In the above-described first embodiment, the personal computer 100 executes a color conversion process. However, a printer may execute a color conversion process.

Figure 18:
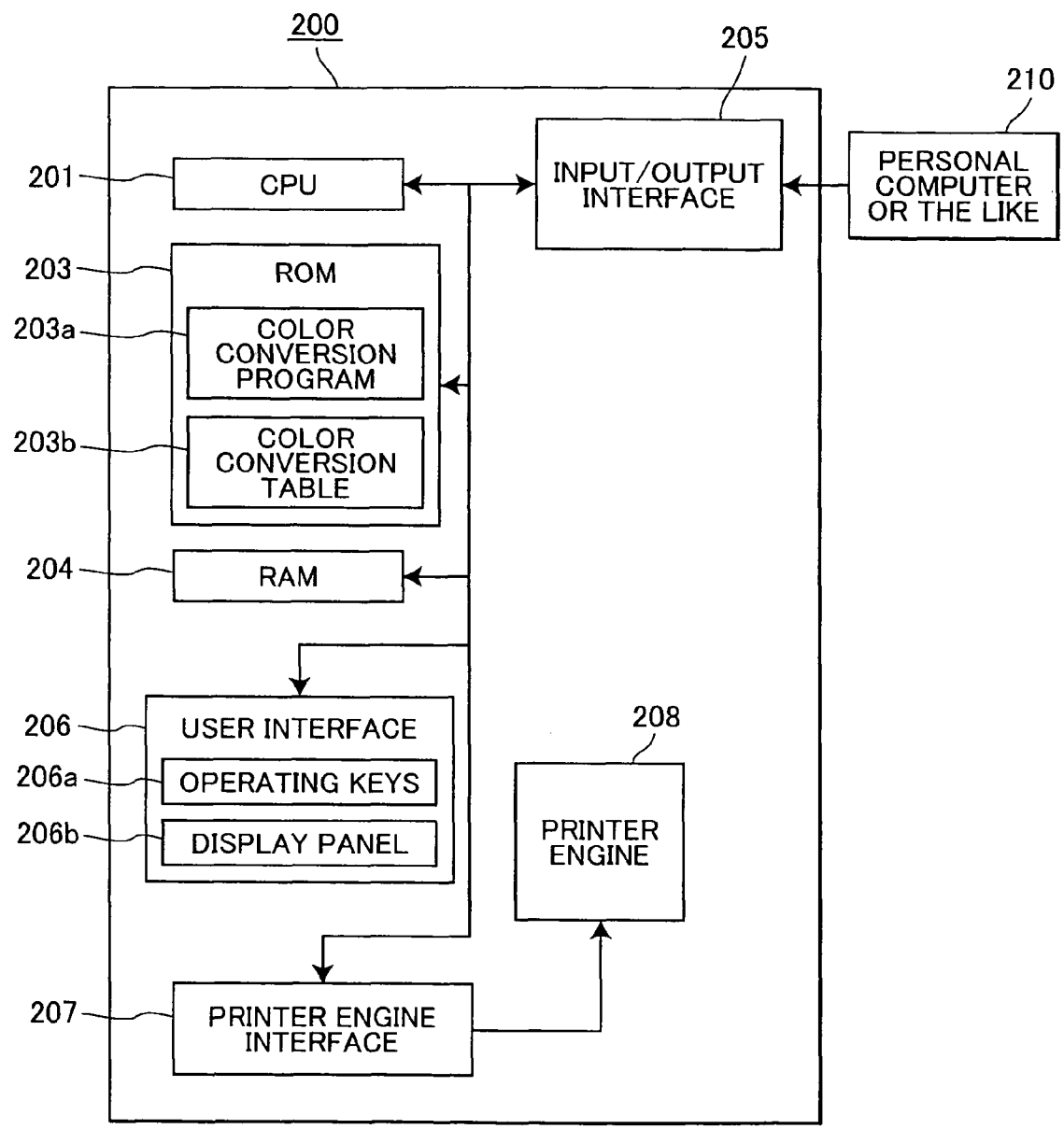
FIG. 18 is a block diagram showing the construction of a printer according to a second embodiment of the present invention.

FIG. 18 shows the construction of a printer 200 according to the second embodiment.

As shown in FIG. 18, the printer 200 includes: a CPU 201 that executes processes based on prescribed programs; a ROM 203 for storing various control programs; a RAM 204 provided with various memory spaces for storing data and the like inputted from external devices; an input/output interface 205; a user interface 206 including a plurality of operating keys 206a that can be operated by the user and a display panel 206b for displaying various data; a printer engine interface 207; and a printer engine 208 for printing images based on output image data (Cout, Mout, Yout, Kout).

Storage areas 203a and 203b are allocated in the ROM 203. The storage area 203a is prestored with the color conversion program (FIG. 3 and FIG. 4 (or FIGS. 15-16), FIG. 5, FIG. 6, and FIG. 10). The storage area 203b is prestored with the RGB-RGB conversion table $T_{RGB\text{-}RGB}$ shown in FIG. 2(a) and the RGB-CMYK conversion table $T_{RGB\text{-}CMYK}$ shown in FIG. 2(b).

The input/output interface 205 is connected to the CPU 201, the ROM 203, the RAM 204, the user interface 206, the printer engine interface 207. The input/output interface 205 is connected to a personal computer 210 or other external device that inputs image data into the printer 200.

In the first embodiment, the CPU 101 in the personal computer 100 executes the printing process (FIG. 3) and the color conversion process (FIG. 4, FIG. 5, FIG. 6, and FIG. 10, or FIG. 15 and FIG. 16). However, according to the present embodiment, the CPU 201 in the printer 200 executes these processes. Since the methods for performing the printing process, color conversion process, and the like are identical to those described in the first embodiment, a description of these processes has been omitted.

As in the first embodiment, the printer 200 of the second embodiment can form images using generated output image data (Cout, Mout, Yout, Kout). The printer 200 maintains the reproducibility of gray and suppresses block noise.

The construction of the printer 200 can be applied to other image forming devices, such as a copy machine, facsimile machine, and the like, that have an image forming function.

While the invention has been described in detail with reference to the specific embodiments thereof, it would be apparent to those skilled in the art that various changes and modifications may be made therein without departing from the spirit of the invention.

For example, the color conversion program may be originally recorded in a recording medium such as a flexible disk, a CD-ROM, or the like, and be supplied to a user, who then loads the program to his/her own personal computer or printer. Or, the color conversion program may be supplied from the communication network such as the Internet to the user, who then loads the program to his/her own personal computer or printer.

The color conversion program may be supplied to: computer systems that are built in color-converting devices, computer systems that are built in image-forming devices, and computer systems that are connected to and that are capable of performing data communications with color-converting devices and/or image-forming devices through wired or wireless communication lines.

Some grid points may be thinned out from the color conversion tables, before the color conversion tables are used for executing interpolation, in order to simplify interpolation calculations during the color conversion process of FIG. 4.

What is claimed is:

1. A color-converting device for converting an input color signal defined in an input-side color space into an output color signal defined in an output-side color space, the color-converting device comprising:

an input portion that receives an input color signal defined in an input-side color space, the input color signal having a plurality of input-side color components, the input-side color space having a plurality of coordinate axes defined by the plurality of input-side color components, the input-side color space having a predetermined gray axis, each position on the gray axis having values equal to one another for the plurality of input-side color components;

a storing portion prestored with a color conversion table indicative of a one-to-one correspondence between a plurality of input-side grid color signals defined in the input-side color space and a plurality of output-side color signals defined in an output-side color space, each input-side grid color signal having the plurality of input-side color components, the plurality of input-side grid color signals indicating a plurality of grid points, each of which is defined by the plurality of coordinate axes in the input-side color space, each output-side color signal having a plurality of output-side color components;

a cube-employing interpolation portion that is configured so as to be capable of selecting, from among all the grid points, eight grid points forming a cube, which includes therein a position of the input color signal defined in the input-side color space, and performing an interpolation calculation to convert the input color signal into an output color signal based on eight output-side color signals for the eight grid points and based on the positions of the eight grid points in relation to the position of the input color signal;

a gray-axis-solid-employing interpolation portion that is configured so as to be capable of selecting, from among all the grid points, several grid points forming a solid, which includes therein a position of the input color signal defined in the input-side color space and whose one edge extends in a direction in which the gray axis extends, and performing an interpolation calculation to convert the input color signal into an output color signal based on several output-side color signals for the several grid points and based on the positions of the several grid points in relation to the position of the input color signal;
a determining portion that checks the color conversion table; and
a selection portion that selects either one of the cube-employing interpolation portion and the gray-axis-solid-employing interpolation portion dependently on the determined results, and that causes the selected one of the cube-employing interpolation portion and the gray-axis-solid-employing interpolation portion to execute its interpolation operation to convert the input color signal into an output color signal,
wherein the determining portion includes a homogeneous determination portion that determines whether or not there exists in the color conversion table at least one homogeneous grid point that is surrounded by a plurality of surrounding grid points, a difference, in each output-side color component, between an output-side color signal for the homogeneous grid point and an output-side color signal for each surrounding grid point being less than or equal to a predetermined threshold value; and
wherein the selection portion selects the cube-employing interpolation portion when the homogeneous determination portion determines that there exists at least one homogeneous grid point in the color conversion table, and selects the gray-axis-solid-employing interpolation portion when the homogeneous determination portion determines that there exists no homogeneous grid point in the color conversion table,
wherein the homogeneous determination portion includes:
a setting portion that sets, among all the grid points in the color conversion table, an examination grid point and a predetermined number of comparative grid points that surround the examination grid point;
a difference calculating portion that calculates differences between the output-side color components in the output-side color signal for the examination grid point and the output-side color components in the output-side color signals for the comparative grid points; and
a comparing portion that compares the calculated differences with the predetermined threshold value, and determines that the examination grid point is a homogeneous grid point if all of the calculated differences are less than or equal to the predetermined threshold value.

2. A color-converting device according to claim 1, wherein the gray-axis-solid-employing interpolation portion selects the several grid points forming the solid that includes therein the position of the input color signal, the one edge extending on the gray axis when the position of the input color signal is located on the gray axis.

3. A color-converting device for converting an input color signal defined in an input-side color space into an output color signal defined in an output-side color space, the color-converting device comprising:
an input portion that receives an input color signal defined in an input-side color space, the input color signal having a plurality of input-side color components, the input-side color space having a plurality of coordinate axes defined by the plurality of input-side color components, the input-side color space having a predetermined gray axis, each position on the gray axis having values equal to one another for the plurality of input-side color components; and
a conversion portion that converts the input color signal into an intermediate color signal defined in an intermediate color space, the intermediate color signal having a plurality of intermediate color components that are made up from three or less intermediate color components including no achromatic color component, the intermediate color space having a plurality of coordinate axes defined by the plurality of intermediate color components, the conversion portion further converting the intermediate color signal into an output color signal defined in the output-side color space, the output color signal having a plurality of color components that are made up from four or more output-side color components including one achromatic color component,
the conversion portion including:
a storing portion prestored with:
a first color conversion table indicative of a one-to-one correspondence between the plurality of input-side grid color signals defined in the input-side color space and a plurality of intermediate color signals defined in the intermediate color space, each input-side grid color signal having the plurality of input-side color components, the plurality of input-side grid color signals indicating a plurality of grid points, each of which is defined by the plurality of coordinate axes in the input-side color space; and
a second color conversion table indicative of a one-to-one correspondence between a plurality of intermediate grid color signals defined in the intermediate color space and a plurality of output-side color signals defined in the output-side color space, each intermediate grid color signal having the plurality of intermediate color components, the plurality of intermediate grid color signals indicating a plurality of grid points, each of which is defined by the plurality of coordinate axes in the intermediate color space,
a cube-employing interpolation portion that is configured so as to be capable of selecting, from among all the grid points, eight grid points forming a cube, which includes therein a position of the intermediate color signal defined in the intermediate color space, and performing an interpolation calculation to convert the intermediate color signal into an output color signal based on eight output-side color signals for the eight grid points and based on the positions of the eight grid points in relation to the position of the intermediate color signal;
a gray-axis-solid-employing interpolation portion that is configured so as to be capable of selecting, from among all the grid points, several grid points forming a solid, which includes therein a position of the input color signal defined in the input-side color space and whose one edge extends in a direction in which the gray axis extends, and performing an interpolation calculation to convert the input color signal into an intermediate color signal based on several intermediate color signals for the several grid points and based on the positions of the several grid points in relation to the position of the input color signal;
a determining portion that determines whether to convert the input color signal into the intermediate color signal or to convert the intermediate color signal into the output color signal; and
a selection portion that selects the first color conversion table and the gray-axis-solid-employing interpolation portion and causes the selected gray-axis-solid-employing interpolation portion to convert the input color signal into the intermediate color signal by using the first color conversion table when the determining portion determines to convert the input color signal into the intermediate color signal, and selects the second color conversion table and the cube-employing in interpolation portion and causes the selected cube-employing interpolation portion to convert the intermediate color signal into the output color signal by using the second color conversion table when the determining portion determines to convert the intermediate color signal into the output color signal, wherein the conversion portion further includes a conversion indicator that is configured so as to be capable of being set to either one of a first conversion status and a second conversion status, the first conversion status indicating that the input color signal is to be converted into the intermediate color signal, the second conversion status indicating that the intermediate color signal is to be converted into the output color signal, wherein the determining portion checks the status of the conversion indicator, determines to convert the input color signal into the intermediate color signal when the conversion indicator is in the first conversion status, and determines to convert the intermediate color signal into the output color signal when the conversion indicator is in the second conversion status, and wherein the conversion portion further includes an indicator controlling portion that first sets the status of the conversion indicator to the first conversion status, and switches the status of the conversion indicator from the first conversion status to the second conversion status after the gray-axis-solid-employing interpolation portion converts the input color signal into the intermediate color signal by using the first color conversion table.

4. A color-converting device according to claim 3, wherein the input-side color space is an RGB color space defined by red, green, and blue color components, the first output-side color space is a CMYK color space defined by cyan, magenta, yellow, and black color components, and the second intermediate color space is another RGB color space defined by red, green, and blue color components.

5. A color-converting device according to claim 1, wherein the gray-axis-solid-employing interpolation portion selects four grid points forming a triangular pyramid which includes therein the position of the input color signal and whose one edge extends in a direction in which the gray axis extends.

6. A color-converting device according to claim 1, wherein the gray-axis-solid-employing interpolation portion selects six grid points forming a slanted triangular prism which includes therein the position of the input color signal and whose one edge extends in a direction in which the gray axis extends.

7. A color-converting device according to claim 1, further comprising an image forming portion that forms a color image based on the output color signal.

8. A storage medium storing a color-converting program readable by a computer storing a color conversion table, the color-converting program being for converting an input color signal defined in an input-side color space into an output color signal defined in an output-side color space, the color-converting program including:

an input program that receives an input color signal defined in an input-side color space, the input color signal having a plurality of input-side color components, the input-side color space having a plurality of coordinate axes defined by the plurality of input-side color components, the input-side color space having a predetermined gray axis, each position on the gray axis having values equal to one another for the plurality of input-side color components, the color conversion table being indicative of a one-to-one correspondence between a plurality of input-side grid color signals defined in the input-side color space and a plurality of output-side color signals defined in an output-side color space, each input-side grid color signal having the plurality of input-side color components, the plurality of input-side grid color signals indicating a plurality of grid points, each of which is defined by the plurality of coordinate axes in the input-side color space, each output-side color signal having a plurality of output-side color components;

a cube-employing interpolation program that selects, from among all the grid points, eight grid points forming a cube, which includes therein a position of the input color signal defined in the input-side color space, and that performs an interpolation calculation to convert the input color signal into an output color signal based on the eight output-side color signals for the eight grid points and based on the positions of the eight grid points in relation to the position of the input color signal;

a gray-axis-solid-employing interpolation program that selects, from among all the grid points, several grid points forming a solid, which includes therein a position of the input color signal defined in the input-side color space and whose one edge extends in a direction in which the gray axis extends, and that performs an interpolation calculation to convert the input color signal into an output color signal based on the several output-side color signals for the several grid points and based on the positions of the several grid points in relation to the position of the input color signal;

a determining program that checks the color conversion table; and a selection program that selects either one of the cube-employing interpolation program and the gray-axis-solid-employing interpolation program dependently on the determined results, and that causes the selected one of the cube-employing interpolation program and the gray-axis-solid-employing interpolation program to execute its interpolation operation to convert the input color signal into an output color signal, wherein the determining program includes a homogeneous determination program that determines whether or not there exists in the color conversion table at least one homogeneous grid point that is surrounded by a plurality of surrounding grid points, a difference, in each output-side color component, between an output-side color signal for the homogeneous grid point and an output-side color signal for each surrounding grid point being less than or equal to a predetermined threshold value; and wherein the selection program selects the cube-employing interpolation program when the homogeneous determination program determines that there exists at least one homogeneous grid point in the color conversion table, and selects the gray-axis-solid-employing interpolation program when the homogeneous determination program determines that there exists no homogeneous grid point in the color conversion table, wherein the homogeneous determination program includes:

a setting program that sets, among all the grid points in the color conversion table, an examination grid point and a predetermined number of comparative grid points that surround the examination grid point;

a difference calculating program that calculates differences between the output-side color components in the output-side color signal for the examination grid point and the output-side color components in the output-side color signals for the comparative grid points; and a comparing program that compares the calculated differences with the predetermined threshold value, and determines that the examination grid point is a homogeneous grid point if all of the calculated differences are less than or equal to the predetermined threshold value.

9. A color-converting device for converting an RGB input color signal defined in an RGB input-side color space dependent on an input-side device into a CMYK output color signal defined in a CMYK output-side color space dependent on an output-side device, the color-converting device comprising:

an input portion that receives an RGB input color signal defined in an RGB input-side color space, the RGB input color signal having red, green, and blue input-side color components, the RGB input-side color space having three coordinate axes defined by the red, green, and blue input-side color components, the RGB input-side color space having a predetermined gray axis, each position on the gray axis having values equal to one another for the red, green, and blue input-side color components; and a conversion portion that converts the RGB input color signal into an RGB output color signal defined in an RGB output-side color space, the RGB output color signal having red, green, and blue output-side color components, the RGB output-side color space having three coordinate axes defined by the red, green, and blue output-side color components, the RGB output-side color space having a predetermined gray axis, each position on the gray axis having values equal to one another for the red, green, and blue output-side color components, the conversion portion further converting the RGB output color signal into a CMYK output color signal defined in a CMYK output-side color space, the CMYK output color signal having cyan, magenta, yellow, and black output-side color components, the CMYK output-side color space being defined as a four dimensional color space defined by the cyan, magenta, yellow, and black output-side color components, the conversion portion including:

a storing portion prestored with an RGB-RGB color conversion table and an RGB-CMYK color conversion table, the RGB-RGB color conversion table being indicative of a one-to-one correspondence between a plurality of RGB grid color signals defined in the RGB input-side color space and a plurality of RGB output-side color signals defined in the RGB output-side color space, each RGB input-side grid color signal having the red, green, and blue input-side color components, the plurality of RGB input-side grid color signals indicating a plurality of grid points, each of which is defined by the three coordinate axes in the RGB input-side color space, each RGB output-side color signal having red, green, and blue output-side color components, the RGB-CMYK color conversion table being indicative of a one-to-one correspondence between a plurality of RGB grid color signals defined in the RGB output-side color space and a plurality of CMYK output-side color signals defined in the CMYK output-side color space, each RGB output-side grid color signal having the red, green, and blue output-side color components, the plurality of RGB output-side grid color signals indicating a plurality of grid points, each of which is defined by the three coordinate axes in the RGB output-side color space, each CMYK output-side color signal having cyan, magenta, yellow, and black output-side color components;

an RGB-RGB conversion portion that executes an RGB-RGB conversion by selecting the RGB-RGB color conversion table indicative of the three-dimensional RGB output-side color space from the storing portion and by executing a gray-axis-solid-employing interpolation to select, from among all the grid points in the RGB-RGB color conversion table, several grid points forming a solid, which includes therein a position of the RGB input color signal defined in the RGB input-side color space and whose one edge extends in a direction in which the gray axis extends, and to perform an interpolation calculation to convert the RGB input color signal into an RGB output color signal based on the several RGB output-side color signals for the several grid points and based on the positions of the several grid points in relation to the position of the RGB input color signal;

an RGB-CMYK conversion portion that executes an RGB-CMYK conversion by selecting the RGB-CMYK color conversion table indicative of the four-dimensional CMYK output-side color space from the storing portion and by executing a cube-employing interpolation portion to select, from among all the grid points in the RGB-CMYK color conversion table, eight grid points forming a cube, which includes therein a position of the RGB output color signal defined in the RGB output-side color space, and to perform an interpolation calculation to convert the RGB output color signal into a CMYK output color signal based on eight CMYK output-side color signals for the eight grid points and based on the positions of the eight grid points in relation to the position of the RGB output color signal, wherein the conversion portion further includes:

a conversion indicator that is configured so as to be capable of being set to either one of an RGB-RGB conversion status and an RGB-CMYK conversion status, the RGB-RGB conversion status indicating that the RGB input color signal is to be converted into the RGB output color signal, the RGB-CMYK conversion status indicating that the RGB output color signal is to be converted into the CMYK output color signal;

a conversion controlling portion that checks the status of the conversion indicator, that controls the RGB-RGB conversion portion to execute the RGB-RGB conversion when the conversion indicator is in the RGB-RGB conversion status, and that controls the RGB-CMYK conversion portion to execute the RGB-CMYK conversion when the conversion indicator is in the RGB-CMYK conversion status; and an indicator controlling portion that first sets the status of the conversion indicator to the RGB-RGB conversion status, and switches the status of the conversion indicator from the RGB-RGB conversion status to the RGB-CMYK conversion status after the RGB-RGB conversion portion has executed the RGB-RGB conversion.

10. A color-converting device according to claim 9, wherein the RGB-RGB conversion portion executes the grayaxis-solid-employing interpolation by selecting four grid points forming a triangular pyramid which includes therein the position of the RGB input color signal and whose one edge extends in a direction in which the gray axis extends.

11. A color-converting device according to claim 9, wherein the RGB-RGB conversion portion executes the gray-axis-solid-employing interpolation by selecting six grid points forming a slanted triangular prism which includes therein the position of the RGB input color signal and whose one edge extends in a direction in which the gray axis extends.

12. A color-converting device according to claim 9, further comprising an image forming portion that forms a color image based on the CMYK output color signal.

13. A color-converting device for converting an RGB input color signal defined in an RGB input-side color space dependent on an input-side device into a CMYK output color signal defined in a CMYK output-side color space dependent on an output-side device, the color-converting device comprising:

an input portion that receives an RGB input color signal defined in an RGB input-side color space, the RGB input color signal having red, green, and blue input-side color components, the RGB input-side color space having three coordinate axes defined by the red, green, and blue input-side color components, the RGB input-side color space having a predetermined gray axis, each position on the gray axis having values equal to one another for the red, green, and blue input-side color components; and a conversion portion that converts the RGB input color signal into an RGB output color signal defined in an RGB output-side color space, the RGB output color signal having red, green, and blue output-side color components, the RGB output-side color space having three coordinate axes defined by the red, green, and blue output-side color components, the RGB output-side color space having a predetermined gray axis, each position on the gray axis having values equal to one another for the red, green, and blue output-side color components, the conversion portion further converting the RGB output color signal into a CMYK output color signal defined in a CMYK output-side color space, the CMYK output color signal having cyan, magenta, yellow, and black output-side color components, the CMYK output-side color space being defined as a four dimensional color space defined by the cyan, magenta, yellow, and black output-side color components, the conversion portion including:

a storing portion prestored with an RGB-RGB color conversion table and an RGB-CMYK color conversion table, the RGB-RGB color conversion table being indicative of a one-to-one correspondence between a plurality of RGB grid color signals defined in the RGB input-side color space and a plurality of RGB output-side color signals defined in the RGB output-side color space, each RGB input-side grid color signal having the red, green, and blue input-side color components, the plurality of RGB input-side grid color signals indicating a plurality of grid points, each of which is defined by the three coordinate axes in the RGB input-side color space, each RGB output-side color signal having red, green, and blue output-side color components, the RGB-CMYK color conversion table being indicative of a one-to-one correspondence between a plurality of RGB grid color signals defined in the RGB output-side color space and a plurality of CMYK output-side color signals defined in the CMYK output-side color space, each RGB output-side grid color signal having the red, green, and blue output-side color components, the plurality of RGB output-side grid color signals indicating a plurality of grid points, each of which is defined by the three coordinate axes in the RGB output-side color space, each CMYK output-side color signal having cyan, magenta, yellow, and black output-side color components;

an RGB-RGB color conversion table selecting portion that selects the RGB-RGB color conversion table from the storing portion;

an RGB-RGB color conversion interpolation determining portion that determines whether or not there exists, in the RGB-RGB color conversion table, at least one homogeneous grid point that is surrounded by a plurality of surrounding grid points, a difference, in each of the red, green, and blue output-side color components, between an RGB output-side color signal for the homogeneous grid point and an RGB output-side color signal for each surrounding grid point being less than or equal to a predetermined threshold value;

an RGB-RGB conversion portion that converts the RGB input color signal into an RGB output color signal by using the RGB-RGB conversion table, the RGB-RGB conversion portion executing a gray-axis-solid-employing interpolation, when the RGB-RGB color conversion interpolation determining portion determines that there exists no homogeneous grid point in the RGB-RGB conversion table, to select, from among all the grid points in the RGB input-side color space, several grid points forming a solid, which includes therein a position of the RGB input color signal defined in the RGB input-side color space and whose one edge extends in a direction in which the gray axis extends, and to perform an interpolation calculation to convert the RGB input color signal into an RGB output color signal based on several RGB output-side color signals for the several grid points and based on the positions of the several grid points in relation to the position of the RGB input color signal, the RGB-RGB conversion portion executing a cube-employing interpolation, when the RGB-RGB color conversion interpolation determining portion determines that there exists at least one homogeneous grid point in the RGB-RGB conversion table, to select, from among all the grid points in the RGB input-side color space, eight grid points forming a cube, which includes therein a position of the RGB input color signal defined in the RGB input-side color space, and to perform an interpolation calculation to convert the RGB input color signal into an RGB output color signal based on eight RGB output-side color signals for the eight grid points and based on the positions of the eight grid points in relation to the position of the RGB input color signal;

an RGB-CMYK color conversion table selecting portion that selects the RGB-CMYK color conversion table from the storing portion;

an RGB-CMYK color conversion interpolation determining portion that determines whether or not there exists, in the RGB-CMYK color conversion table, at least one homogeneous grid point that is surrounded by a plurality of surrounding grid points, a difference, in each of the cyan, magenta, yellow, and black output-side color components, between a CMYK output-side color signal for the homogeneous grid point and a CMYK output-side color signal for each surrounding grid point being less than or equal to a predetermined threshold value;

an RGB-CMYK conversion portion that converts the RGB output color signal into a CMYK output color signal by using the RGB-CMYK conversion table, the RGB-CMYK conversion portion executing a gray-axis-solid-employing interpolation, when the RGB-CMYK color conversion interpolation determining portion determines that there exists no homogeneous grid point in the RGB-CMYK conversion table, to select, from among all the grid points in the RGB output-side color space, several grid points forming a solid, which includes therein a position of the RGB output color signal defined in the RGB output-side color space and whose one edge extends in a direction in which the gray axis extends, and to perform an interpolation calculation to convert the RGB output color signal into a CMYK output color signal based on several CMYK output-side color signals for the several grid points and based on the positions of the several grid points in relation to the position of the RGB output color signal, the RGB-CMYK conversion portion executing a cube-employing interpolation, when the RGB-CMYK color conversion interpolation determining portion determines that there exists at least one homogeneous grid point in the RGB-CMYK conversion table, to select, from among all the grid points in the RGB output-side color space, eight grid points forming a cube, which includes therein a position of the RGB output color signal defined in the RGB output-side color space, and to perform an interpolation calculation to convert the RGB output color signal into a CMYK output color signal based on eight CMYK output-side color signals for the eight grid points and based on the positions of the eight grid points in relation to the position of the RGB output color signal, wherein the RGB-RGB color conversion interpolation determining portion includes:
- a setting portion that sets, among all the grid points in the RGB-RGB color conversion table, an examination grid point and a predetermined number of comparative grid points that surround the examination grid point;
- a difference calculating portion that calculates differences between the red, green, and blue output-side color components in the RGB output-side color signal for the examination grid point and the red, green, and blue output-side color components in the RGB output-side color signals for the comparative grid points; and
- a comparing portion that compares the calculated differences with the predetermined threshold value, and determines that the examination grid point is a homogeneous grid point if all of the calculated differences are less than or equal to the predetermined threshold value, and wherein the RGB-CMYK color conversion interpolation determining portion includes:
- a setting portion that sets, among all the grid points in the RGB-CMYK color conversion table, an examination grid point and a predetermined number of comparative grid points that surround the examination grid point;
- a difference calculating portion that calculates differences between the cyan, magenta, yellow, and black output-side color components in the CMYK output-side color signal for the examination grid point and the cyan, magenta, yellow, and black output-side color components in the CMYK output-side color signals for the comparative grid points; and
- a comparing portion that compares the calculated differences with the predetermined threshold value, and determines that the examination grid point is a homogeneous grid point if all of the calculated differences are less than or equal to the predetermined threshold value.

14. A color-converting device according to claim 13, wherein the RGB-RGB conversion portion executes, when the RGB-RGB color conversion interpolation determining portion determines that there exists no homogeneous grid point in the RGB-RGB conversion table, the gray-axis-solid-employing interpolation by selecting four grid points forming a triangular pyramid which includes therein the position of the RGB input color signal and whose one edge extends in a direction in which the gray axis extends, and wherein the RGB-CMYK conversion portion executes, when the RGB-CMYK color conversion interpolation determining portion determines that there exists no homogeneous grid point in the RGB-CMYK conversion table, the gray-axis-solid-employing interpolation by selecting four grid points forming a triangular pyramid which includes therein the position of the RGB output color signal and whose one edge extends in a direction in which the gray axis extends.

15. A color-converting device according to claim 13, wherein the RGB-RGB conversion portion executes, when the RGB-RGB color conversion interpolation determining portion determines that there exists no homogeneous grid point in the RGB-RGB conversion table, the gray-axis-solid-employing interpolation by selecting six grid points forming a slanted triangular prism which includes therein the position of the RGB input color signal and whose one edge extends in a direction in which the gray axis extends, and wherein the RGB-CMYK conversion portion executes, when the RGB-CMYK color conversion interpolation determining portion determines that there exists no homogeneous grid point in the RGB-CMYK conversion table, the gray-axis-solid-employing interpolation by selecting six grid points forming a slanted triangular prism which includes therein the position of the RGB output color signal and whose one edge extends in a direction in which the gray axis extends.

16. A color-converting device according to claim 13, further comprising an image forming portion that forms a color image based on the CMYK output color signal.

17. A color-converting device according to claim 3, wherein the gray-axis-solid-employing interpolation portion selects the several grid points forming the solid that includes therein the position of the input color signal, the one edge extending on the gray axis when the position of the input color signal is located on the gray axis.

18. A color-converting device according to claim 3, wherein the gray-axis-solid-employing interpolation portion selects four grid points forming a triangular pyramid which includes therein the position of the input color signal and whose one edge extends in a direction in which the gray axis extends.

19. A color-converting device according to claim 3, wherein the gray-axis-solid-employing interpolation portion selects six grid points forming a slanted triangular prism which includes therein the position of the input color signal and whose one edge extends in a direction in which the gray axis extends.

20. A color-converting device according to claim 3, further comprising an image forming portion that forms a color image based on the output color signal.

21. A storage medium storing a color-converting program readable by a computer storing a first color conversion table and a second color conversion table, the color-converting program being for converting an input color signal defined in an input-side color space into an output color signal defined in an output-side color space, the color-converting program including:

an input program that receives an input color signal defined in an input-side color space, the input color signal having a plurality of input-side color components, the input-side color space having a plurality of coordinate axes defined by the plurality of input-side color components, the input-side color space having a predetermined gray axis, each position on the gray axis having values equal to one another for the plurality of input-side color components;

a conversion program that converts the input color signal into an intermediate color signal defined in an intermediate color space, the conversion program converting the input color signal into the intermediate color signal by using a first color conversion table, the intermediate color signal having a plurality of intermediate color components that are made up from three or less intermediate color components including no achromatic color component, the intermediate color space having a plurality of coordinate axes defined by the plurality of intermediate color components, the conversion program further converting the intermediate color signal into an output color signal defined in an output-side color space, the conversion program converting the intermediate color signal into the output color signal by using the second color conversion table, the output-side color signal having a plurality of color components that are made up from four or more output-side color components including one achromatic color component, the first color conversion table being indicative of a one-to-one correspondence between a plurality of input-side grid color signals defined in the input-side color space and a plurality of intermediate color signals defined in the intermediate color space each intermediate grid color signal having the plurality of intermediate color components, the plurality of intermediate grid color signals indicating a plurality of grid points, each of which is defined by the plurality of coordinate axes in the intermediate color space, the second color conversion table being indicative of a one-to-one correspondence between the plurality of intermediate grid color signals defined in the input-side color space and a plurality of output-side color signals defined in the output-side color space;

a cube-employing interpolation program that selects, from among all the grid points, eight grid points forming a cube, which includes therein a position of the intermediate color signal defined in the intermediate color space, and performing an interpolation calculation to convert the intermediate color signal into an output color signal based on eight output-side color signals for the eight grid points and based on the positions of the eight grid points in relation to the position of the intermediate color signal;

a gray-axis-solid-employing interpolation program that selects, from among all the grid points, several grid points forming a solid, which includes therein a position of the input color signal defined in the input-side color space and whose one edge extends in a direction in which the gray axis extends, and performing an interpolation calculation to convert the input color signal into an intermediate color signal based on several intermediate color signals for the several grid points and based on the positions of the several grid points in relation to the position of the input color signal;

a determining program that determines whether to convert the input color signal into the intermediate color signal or to convert the intermediate color signal into the output color signal; and a selection program that selects the first color conversion table and the gray-axis-solid-employing interpolation program and causes the selected gray-axis-solid-employing interpolation program to convert the input color signal into the intermediate color signal by using the first color conversion table when the determining program determines to convert the input color signal into the intermediate color signal, and selects the second color conversion table and the cube-employing interpolation program and causes the selected cube-employing in interpolation program to convert the intermediate color signal into the output color signal by using the second color conversion table when the determining program determines to convert the intermediate color signal into the output color signal, wherein the conversion program further includes an indicator controlling program that first sets a status of a conversion indicator to a first conversion status, and switches the status of the conversion indicator from the first conversion status to a second conversion status after the gray-axis-solid-employing interpolation program converts the input color signal into the intermediate color signal by using the first color conversion table, the first conversion status indicating that the input color signal is to be converted into the intermediate color signal, the second conversion status indicating that the intermediate color signal is to be converted into the output color signal, and wherein the determining program includes a checking program that checks the status of the conversion indicator, determines to convert the input color signal into the intermediate color signal when the conversion indicator is in the first conversion status, and determines to convert the intermediate color signal into the output color signal when the conversion indicator is in the second conversion status.

* * * * *